United States Patent
Ohtake et al.

(10) Patent No.: US 6,721,105 B2
(45) Date of Patent: Apr. 13, 2004

(54) ZOOM LENS SYSTEM

(75) Inventors: Motoyuki Ohtake, Saitama (JP); Atsushi Shibayama, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/308,033

(22) Filed: Dec. 3, 2002

(65) Prior Publication Data

US 2003/0117717 A1 Jun. 26, 2003

(30) Foreign Application Priority Data

Dec. 12, 2001 (JP) ........................... 2001-378781
Dec. 12, 2001 (JP) ........................... 2001/378819

(51) Int. Cl.$^7$ ................................ G02B 15/14
(52) U.S. Cl. ........................... 359/676; 359/687
(58) Field of Search ................... 359/687, 683, 359/676

(56) References Cited

U.S. PATENT DOCUMENTS

| | | | | |
|---|---|---|---|---|
| 4,830,477 A | * | 5/1989 | Takahashi et al. | 359/683 |
| 5,202,992 A | | 4/1993 | Banno et al. | 359/676 |
| 5,532,881 A | * | 7/1996 | Nakatsuji et al. | 359/684 |
| 6,124,984 A | | 9/2000 | Shibayama et al. | 359/689 |
| 6,249,389 B1 | * | 6/2001 | Ohtake | 359/684 |
| 6,331,917 B1 | | 12/2001 | Ishii et al. | 359/687 |
| 6,404,561 B1 | | 6/2002 | Isono et al. | 359/683 |

FOREIGN PATENT DOCUMENTS

| | | |
|---|---|---|
| JP | 3-154014 | 7/1991 |
| JP | 6-194572 | 7/1994 |

OTHER PUBLICATIONS

English Abstract of Japanese Patent Application Laid–Open No. JP 2001–194590, Jul. 19, 2001.
English Abstract of Japanese Patent Application Laid–Open No. 11–52246, Feb. 26, 1999.
English Abstract of Japanese Patent Application Laid–Open No. 2001–133687, May 18, 2001.

* cited by examiner

*Primary Examiner*—Jordan M. Schwartz
(74) *Attorney, Agent, or Firm*—Miles & Stockbridge P.C.

(57) ABSTRACT

A zoom lens system includes, in order from an object, a first lens group G1 having positive refractive power, a second lens group G2 having negative refractive power, a third lens group G3. having positive refractive power, a fourth lens group G4 having positive refractive power, and a fifth lens group G5 having positive refractive power. Upon zooming from a wide-angle end state to a telephoto end state, a separation between the first lens group G1 and the second lens group G2 increases, a separation between the second lens group G2 and the third lens group G3 decreases, a separation between the third lens group G3 and the fourth lens group G4 varies, a separation between the fourth lens group G4 and the fifth lens group G5 increases, and the third lens group G3 and the fourth lens group G4 moving to the object side. Predetermined conditional expressions are satisfied.

20 Claims, 27 Drawing Sheets

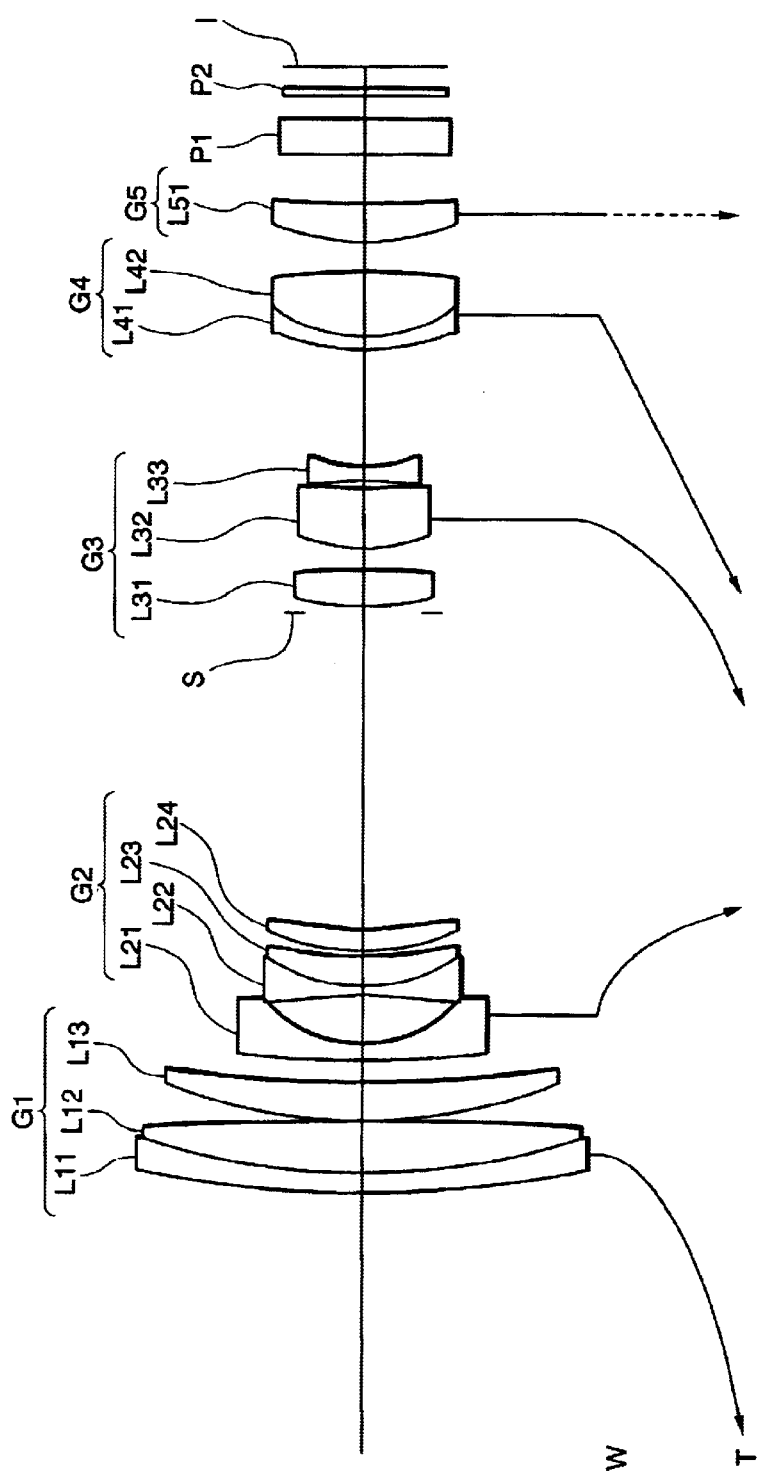

ZOOM LENS SYSTEM

The disclosures of the following priority applications are herein incorporated by reference:
Japanese Patent Application No. 2001-378781 filed Dec. 12, 2001; and
Japanese Patent Application No. 2001-378819 filed Dec. 12, 2001.

BACKGROUND OF THE INVENTION

1. Field of the Invention

The present invention relates to a zoom lens system suitable for video cameras and electronic still cameras using solid state imaging device, in particular to a zoom lens system having the zoom ratio of about 6 or more, the angle of view of 60° or more in a wide-angle end state together with high optical performance and compactness.

2. Related Background Art

In a camera system, a recording method has been known in which a shot image is converted into electric output by a light detector constructed by arranged photoelectric converters such as CCD (Charge Coupled Device), CMOS (Complementary Metal Oxide Semiconductor), or the like.

With the recent progress in fine pattern processing in semiconductor devices, an increase in processing speed of a CPU and in high integration of recording medium allows a large amount of image data to be processed with high speed, which has not been possible before. Moreover, in the light detector also, an increase in integration allows recording with high spatial frequency and an increase in compactness allows compactness of whole camera system.

However, there has been a problem that because of high integration and compactness of the light detector, a narrowed detection area of a photoelectric converter decreases an electric output to increase the effect of noise. In order to prevent this, an optical system is made to be large aperture ratio to increase an amount of light reached the light detector. Moreover, minute lens elements (so-called "micro-lens-array") are arranged right in front of respective photoelectric converters. The micro-lens-array has a restriction to the position of the exit pupil of the optical system instead of leading a light reaching a blind spot between adjacent photoelectric converters onto a photoelectric converter. When the position of the exit pupil of the optical system approaches the light detector, the angle between the principal ray reaching the light detector and the optical axis becomes large, so that off-axis light flux going toward periphery of the image makes a large angle relative to the optical axis. As a result, off-axis light flux not reaching the light detector causes insufficiency of light amount.

A camera recording an object image using photoelectric converters as a light detector, the so-called digital still camera, has strong points of easy handling image data such that development is not required, and a shot image is easily confirmed. However, it has weak points to a film camera such that imaging quality is inferior to a film camera, and it requires to be connected to a device such as a personal computer, so that the diffusion of the digital camera has not increased. Recently, with increase of imaging quality of digital cameras and the diffusion of the device by lowering price, digital cameras have been increasingly popular.

As for increase of imaging quality, it is indispensable to increase in optical performance of the optical system as well as the above-mentioned increase in integration of the light detector.

Moreover, increase in a zoom ratio improves the degree of freedom for shooting, for example, permitting a photographer to shoot a close-up or to shoot a wide area when shooting with a close object distance such as indoors.

In particular, there have been several documents relevant to the subject such as Japanese Patent Application Laid-Open Nos. 6-194572, 2001-133687, 2001-194590, and 11-52246.

The zoom lens systems disclosed in Japanese Patent Application Laid-Open Nos. 6-194572 and 2001-133687 have been composed of 4 lens groups which are, in order from an object, a first lens group with positive refractive power, a second lens group with negative refractive power, a third lens group with positive refractive power, and a fourth lens group with positive refractive power and wherein the first lens group is fixed along the optical axis regardless of state of lens group positions, and zooming is carried out by moving the second lens group through the fourth lens group along the optical axis.

The zoom lens system disclosed in Japanese Patent Application Laid-Open No. 2001-194590 has realized a high zoom ratio by consisting of, in order from an object, a first lens group with positive refractive power, a second lens group with negative refractive power, a third lens group with positive refractive power, and a plurality of lens groups locating to an image side of the third lens group.

However, zoom lens systems disclosed before have had a problem that although both high optical performance and a high zoom ratio can be satisfied, compactness of the optical system is difficult to be realized, so that a large-sized optical system disturbs to be carried with.

The zoom lens system disclosed in Japanese Patent Application Laid-Open No. 6-194572 has realized both large aperture ratio and a high zoom ratio, but the total lens length and the diameter of the lens relative to an image height have been difficult to be compact. The zoom lens system disclosed in Japanese Patent Application Laid-Open No. 2001-133687 has realized compactness by reducing the number of lens elements, but the high zoom ratio has not been realized.

The zoom lens system disclosed in Japanese Patent Application Laid-Open No. 2001-194590 has realized both large aperture ratio and a high zoom ratio, but since the lens diameter of a first lens group and a second lens group is extremely large, compactness and a high zoom ratio have not been able to be satisfied at a time.

The zoom lens system disclosed in Japanese Patent Application Laid-Open No. 11-52246 has been suitable for video cameras and electric still rameras using a solid state imaging device or the like. However, the zoom lens system has had the zoom ratio of about 3, so that a sufficiently high zoom ratio has not been obtained.

SUMMARY OF THE INVENTION

The present invention is made in view of the aforementioned problems and has an object to provide a zoom lens system having the zoom ratio of about 6 or more, the angle of view of 60° or more in the wide-angle end state together with high optical performance and compactness.

According to one aspect of the present invention, a zoom lens system includes, in order from an object, a first lens group having positive refractive power, a second lens group having negative refractive power, a third lens group having positive refractive power, a fourth lens group having positive refractive power, and a fifth lens group having positive refractive power. When the state of lens group positions varies from a wide-angle end state to a telephoto end state, a separation between the first lens group and the second lens group increases, a separation between the second lens group and the third lens group decreases, a separation between the third lens group and the fourth lens group varies, a separation between the fourth lens group and the fifth lens group increases, and the third lens group and the fourth lens group moving to the object side. The following conditional expressions (1) through (5) are satisfied;

$$4.5 < F1/FW < 8.0 \tag{1}$$

$$0.8 < |F2/FW| < 1.8 \tag{2}$$

$$2.3 < F3/FW < 4.5 \tag{3}$$

$$2.0 < F4/FW < 5.2 \tag{4}$$

$$0.2 < (D34W - D34T)/FW < 1.0 \tag{5}$$

where FW denotes the focal length of the zoom lens system in the wide-angle end state, F1 denotes the focal length of the first lens group, F2 denotes the focal length of the second lens group, F3 denotes the focal length of the third lens group, F4 denotes the focal length of the fourth lens group, D34W denotes the separation between the third lens group and the fourth lens group in the wide-angle end state, and D34T denotes the separation between the third lens group and the fourth lens group in the telephoto end state.

In one preferred embodiment of the present invention, when the state of lens group positions varies from the wide-angle end state to the telephoto end state, the first lens group moves such that the position of the first lens group in the telephoto end state is to the object side of the position of the first lens group in the wide-angle end state, and the fifth lens group is fixed. The following conditional expression (6) is preferably satisfied;

$$0.4 < M1/FW < 3.0 \tag{6}$$

where M1 denotes a moving amount of the first lens group when the state of lens group positions varies from the wide-angle end state to the telephoto end state.

In one preferred embodiment of the present invention, the fourth lens group is composed of a cemented lens constructed by a positive lens element cemented with a negative lens element, and the following conditional expression (7) is preferably satisfied;

$$0.2 < N4N - N4P \tag{7}$$

where N4N denotes a refractive index of the negative lens element in the fourth lens group at d-line ($\lambda$=587.6 nm), and N4P denotes a refractive index of the positive lens element in the fourth lens group at d-line ($\lambda$=587.6 nm).

In one preferred embodiment of the present invention, the focusing from a distant object to a close object is carried out by moving the fifth lens group to the object side, and the following conditional expression (8) is preferably satisfied;

$$3.0 < FS/FW < 7.0 \tag{8}$$

where F5 denotes the focal length of the fifth lens group.

In one preferred embodiment of the present invention, the fifth lens group is composed of a cemented lens constructed by a positive lens element cemented with a negative lens element, and the following conditional expression (9) is preferably satisfied;

$$15.0 < \nu 5P - \nu 5N \tag{9}$$

where $\nu$5P denotes Abbe number of the positive lens element in the fifth lens group, and $\nu$5N denotes Abbe number of the negative lens element in the fifth lens group.

In one preferred embodiment of the present invention, the fifth lens group is composed of a single positive lens element, and the following conditional expression (10) is preferably satisfied;

$$0.7 < (RR + RF)/(RR - RF) < 2.0 \tag{10}$$

where RP denotes a radius of curvature of the object side surface of the positive lens element in the fifth lens group, and RR denotes a radius of curvature of an image side surface of the positive lens element in the fifth lens group.

According to another aspect of the present invention, a zoom lens system includes, in order from an object, a first lens group having positive refractive power, a second lens group having negative refractive power, a third lens group having positive refractive power, and a fourth lens group having positive refractive power. When the state of lens group positions varies from a wide-angle end state to a telephoto end state, at least the first lens group and the fourth lens group moves to the object side such that a separation between the first lens group and the second lens group increases, a separation between the second lens group and the third lens group decreases and a separation between the third lens group and the fourth lens group decreases. The third lens group is composed of three lens elements which are, in order from the object, a first positive lens element, a second positive lens element, and a negative lens element. The fourth lens group includes a positive lens element located to the most image side and a negative lens element located to the object side of the positive lens element. The following conditional expressions (11) through (13) are satisfied;

$$0.015 < D3P/FT < 0.100 \tag{11}$$

$$0.10 < YO/(BFW - RE) < 0.25 (RE < 0) \tag{12}$$

$$0.4 < \Delta 4/(FT \cdot FW)^{1/2} < 1.0 \tag{13}$$

where D3P denotes the thickness of the second positive lens element in the third lens group, FT denotes the focal length of the zoom lens system in the telephoto end state, YO denotes a half of the diagonal of the image frame, RE denotes a radius of curvature of the most image side surface of the fourth lens group, BFW denotes a distance from the most image side surface of the fourth lens group to the image plane in the wide-angle end state, $\Delta$4 denotes a moving amount of the fourth lens group (positive upon moving to the object side) when the state of lens group positions varies from the wide-angle end state to the telephoto end state, and FW denotes the focal length of the zoom lens system in the wide-angle end state.

In one preferred embodiment of the present invention, at least one of the following conditional expressions (14) and (15) is preferably satisfied;

$$0.1 < |F3N|/FT < 0.7 \tag{14}$$

$$0.2 < |R31|/F3 < 2.0 \tag{15}$$

where F3N denotes the focal length of the negative lens element located in the third lens group, FT denotes the focal length of the zoom lens system in the telephoto end state, R31 denotes a radius of curvature of the image side surface of the negative lens element located in the third lens group, and F3 denotes the focal length of the third lens group.

In one preferred embodiment of the present invention, the second lens group is composed of three lens elements which are, in order from the object, a first negative lens element having a concave surface facing to the image, a second negative lens element having a concave surface facing to the object, and a positive lens element having a convex surface facing to the object. The following conditional expression (16) is preferably satisfied;

$$-0.7<(R21+R22)/(R21-R22)<0 \qquad (16)$$

where R21 denotes a radius of curvature of the image side surface of the first negative lens element located in the second lens group, and R22 denotes a radius of curvature of the object side surface of the second negative lens element located in the second lens group.

BRIEF DESCRIPTION OF THE DRAWINGS

FIG. 10 is a diagram showing the lens arrangement of a zoom lens system according to Example 4 of the first embodiment of the present invention together with movement of each lens group upon zooming.

DESCRIPTION OF THE PREFERRED EMBODIMENTS

First Embodiment

Figure 1:
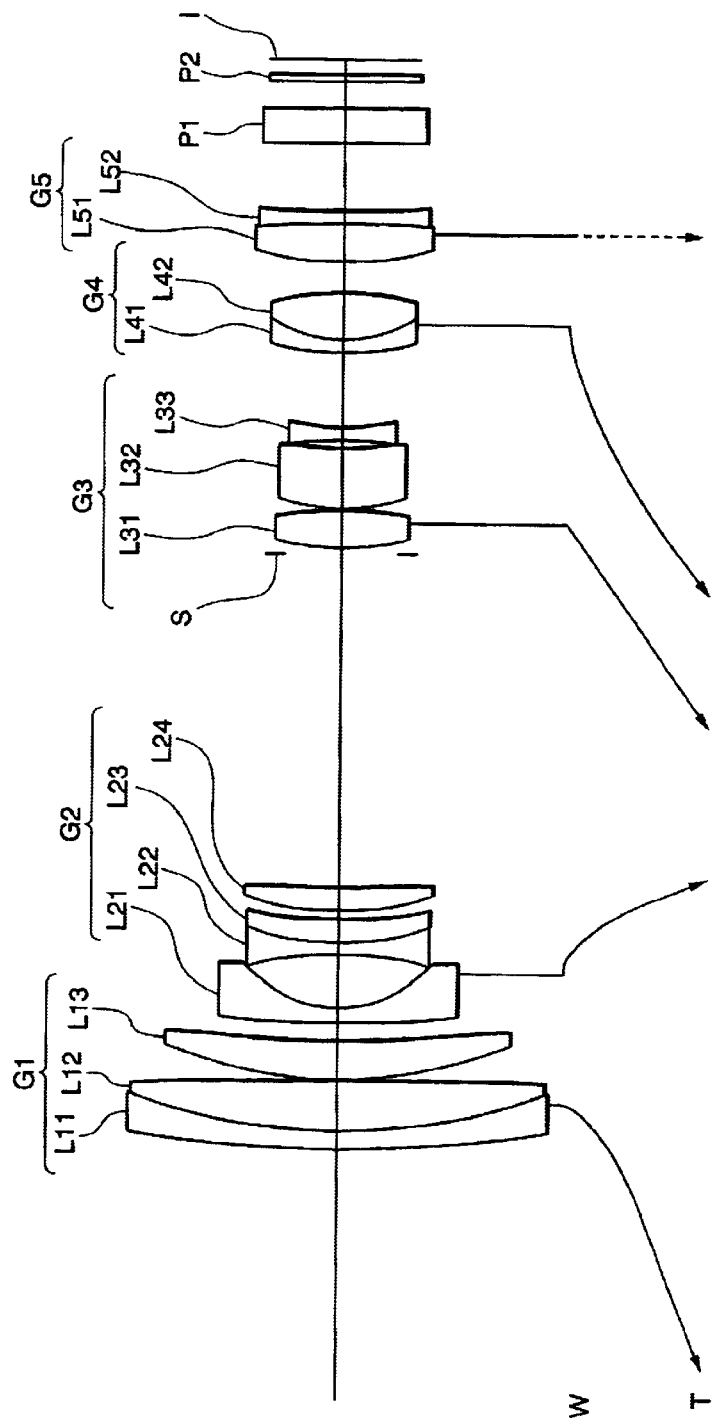
FIG. 1 is a diagram showing the lens arrangement of a zoom lens system according to Example 1 of a first embodiment of the present invention together with movement of each lens group upon zooming.

A first embodiment of the present invention are going to be explained below. A zoom lens system according to the first embodiment includes, in order from an object, a first lens group having positive refractive power, a second lens group having negative refractive power, a third lens group having positive refractive power, a fourth lens group having positive refractive power, and a fifth lens group having positive refractive power. When the state of lens group positions varies from a wide-angle end state to a telephoto end state, a separation between the first lens group and the second lens group increases, a separation between the second lens group and the third lens group decreases, a separation between the third lens group and the fourth lens group varies, a separation between the fourth lens group and the fifth lens group increases, and the third lens group and the fourth lens group moving to the object side. The following conditional expressions (1) through (5) are satisfied;

$$4.5 < F1/FW < 8.0 \quad (1)$$

$$0.8 < |F2/FW| < 1.8 \quad (2)$$

$$2.3 < F3/FW < 4.5 \quad (3)$$

$$2.0 < F4/FW < 5.2 \quad (4)$$

$$0.2 < (D34W - D34T)/FW < 1.0 \quad (5)$$

where FW denotes the focal length of the zoom lens system in the wide-angle end state, F1 denotes the focal length of the first lens group, F2 denotes the focal length of the second lens group, F3 denotes the focal length of the third lens group, F4 denotes the focal length of the fourth lens group, D34W denotes the separation between the third lens group and the fourth lens group in the wide-angle end state, and D34T denotes the separation between the third lens group and the fourth lens group in the telephoto end state.

The zoom lens system according to the first embodiment of the present invention has the construction that a positive lens group is located in front of (to the object side of) the negative lens group, and when the state of lens group positions varies from a wide-angle end state to a telephoto end state, the separation between the first lens group and the second lens group increases, and the third lens group and the fourth lens group are moved to the object side. With this construction, the zoom lens system according to the first embodiment of the present invention achieves a high zoom ratio.

Moreover, the zoom lens system according to the first embodiment of the present invention has the construction that three positive lens groups (the third, fourth and fifth lens groups) are located to the image side of the second lens group and each lens group separation can be varied. With this construction, increasing amount of variation in aberration accompanied with a high zoom ratio can be corrected well.

The above-mentioned conditional expressions (1) through (5) are going to be explained below. Conditional expression (1) defines an appropriate range of the focal length of the first lens group. When the ratio F1/FW falls below the lower limit of conditional expression (1), the focal length of the first lens group becomes short, so that it becomes difficult to sufficiently correct spherical aberration, on-axis chromatic aberration, or the like. On the other hand, when the ratio F1/FW exceeds the upper limit of conditional expression (1), the effect of the first lens group becomes weak, so that it becomes difficult to accomplish a high zoom ratio.

Conditional expression (2) defines an appropriate range of the focal length of the second lens group. When the ratio |F2/FW| falls below the lower limit of conditional expression (2), the focal length of the second lens group becomes short, so that it becomes difficult to correct spherical aberration and coma sufficiently. On the other hand, when the ratio exceeds the upper limit of conditional expression (2), the focal length of the second lens group becomes long. Accordingly, the effective diameter of the first lens group becomes large, so that it is not desirable.

Conditional expression (3) defines an appropriate range of the focal length of the third lens group. When the ratio F3/FW falls below the lower limit of conditional expression (3), the focal length of the third lens group becomes short, so that it becomes difficult to sufficiently correct spherical aberration, coma, or the like. On the other hand, when the ratio F3/FW exceeds the upper limit of conditional expression (3), the effect of the third lens group becomes weak, so that it becomes difficult to accomplish a high zoom ratio.

Conditional expression (4) defines an appropriate range of the focal length of the fourth lens group. When the ratio F4/FW falls below the lower limit of conditional expression (4), the focal length of the fourth lens group becomes short, so that it becomes difficult to sufficiently correct spherical aberration, astigmatism, or the like. On the other hand, when the ratio F4/FW exceeds the upper limit of conditional expression (4), the effect of the fourth lens group becomes weak, so that it becomes difficult to satisfactorily correct variation in various aberrations produced upon zooming.

Conditional expression (5) defines an appropriate range of variation in the separation between the third lens group and the fourth lens group upon zooming. In the zoom lens system according to the first embodiment of the present invention, the third lens group and the fourth lens group are made to have remnant aberrations of opposite directions with each other so as to correct aberrations by canceling each other. Moreover, curvature of field is satisfactorily corrected by varying the separation between the third lens group and the fourth lens group.

When the ratio (D34W−D34T)/FW falls below the lower limit of conditional expression (5), variation in the separation between the third lens group and the fourth lens group becomes small. Accordingly, it becomes difficult to sufficiently correct variation in curvature of field. Moreover, aberrations produced in each lens group (the third and fourth lens groups) become large, so that decentering tolerance is brought to be worse. On the other hand, when the ratio exceeds the upper limit of conditional expression (5), variation in the separation between the third lens group and the fourth lens group becomes too large. Accordingly, the total lens length of the zoom lens system becomes large.

Furthermore, according to the first embodiment of the present invention, it is preferable that when the state of lens group positions varies from the wide-angle end state to the telephoto end state, the first lens group moves such that the position of the first lens group in the telephoto end state is to the object side of the position of the first lens group in the wide-angle end state, and the fifth lens group is fixed. The following conditional expression (6) is preferably satisfied;

$$0.4 < M1/FW < 3.0 \quad (6)$$

where M1 denotes a moving amount of the first lens group when the state of lens group positions varies from the wide-angle end state to the telephoto end state.

In the zoom lens system according to the first embodiment of the present invention, compactness is accomplished by constructing the first lens group such that when the state of lens group positions varies from the wide-angle end state to the telephoto end state, the position of the first lens group in the telephoto end state is to the object side of the position of the first lens group in the wide-angle end state, and the conditional expression (6) is satisfied.

Moreover, construction of the zoom lens system according to the first embodiment of the present invention can be simple by fixing the position of the fifth lens group upon zooming from the wide-angle end state to the telephoto end state.

Conditional expression (6) defines an appropriate range of the moving amount of the first lens group upon zooming from the wide-angle end state to the telephoto end state. When the ratio M1/FW exceeds the upper limit of conditional expression (6), the moving amount of the first lens group upon zooming becomes too large. Accordingly, the mechanical structure of the lens barrel becomes complicate, so that it is not desirable. On the other hand, when the ratio falls below the lower limit of conditional expression (6), the moving amount of the first lens group upon zooming becomes small. Accordingly, the effect diameter of the first lens group becomes large, so that it is undesirable.

Furthermore, according to the first embodiment of the present invention, it is preferable that the fourth lens group is composed of a cemented lens constructed by a positive lens element cemented with negative lens element, and the following conditional expression (7) is satisfied;

$$0.2 < N4N - N4P \tag{7}$$

where N4N denotes a refractive index of the negative lens element in the fourth lens group at d-line ($\lambda$=587.6 nm), and N4P denotes a refractive index of the positive lens element in the fourth lens group at d-line ($\lambda$=587.6 nm).

By constructing the zoom lens system according to the first embodiment of the present invention like this, various aberrations such as spherical aberration, coma, astigmatism, and the like can be corrected well.

Conditional expression (7) defines an appropriate range of the difference in refractive indexes of the negative lens element and the positive lens element in the fourth lens group. When the value N4N–N4P falls below the lower limit of conditional expression (7), it becomes difficult to satisfactorily correct various aberrations such as spherical aberration, coma, astigmatism, and the like.

Furthermore, according to the first embodiment of the present invention, it is preferable that the focusing from a distant object to a close object is carried out by moving the fifth lens group to the object side, and the following conditional expression (8) is preferably satisfied;

$$3.0 < F5/FW < 7.0 \tag{8}$$

where F5 denotes the focal length of the fifth lens group.

By constructing the zoom lens system according to the first embodiment of the present invention like this,.excellent optical performance can be obtained upon shooting at a close object and the focusing mechanism can be simplified.

Conditional expression (8) defines an appropriate range of the focal length of the fifth lens group. When the ratio F5/FW exceeds the upper limit of conditional expression (8), it becomes difficult to shorten the closest shooting distance. On the other hand, when the ratio F5/FW falls below the lower limit of conditional expression (8), the whole lens system becomes large, so that it is undesirable.

Furthermore, according to the first embodiment of the present invention, it is preferable that the fifth lens group is composed of a cemented lens constructed by a positive lens element cemented with a negative lens element, and the following conditional expression (9) is preferably satisfied;

$$15.0 < \nu 5P - \nu 5N \tag{9}$$

where $\nu$5P denotes Abbe number of the positive lens element in the fifth lens group, and $\nu$5N denotes Abbe number of the negative lens element in the fifth lens group.

By constructing the zoom lens system according to the first embodiment of the present invention like this, variation in on-axis chromatic aberration accompanying with focusing in the telephoto end state can be satisfactorily suppressed.

Conditional expression (9) defines an appropriate range of difference in Abbe numbers of the positive lens element and the negative lens element in the fifth lens group. When the value $\nu$5P–$\nu$5N falls below the lower limit of conditional expression (9), variation in on-axis chromatic aberration accompanying with focusing in the telephoto end state becomes large, so that it is undesirable.

Furthermore, according to the first embodiment of the present invention, it is preferable that the fifth lens group is composed of a single positive lens element, and the following conditional expression (10) is preferably satisfied;

$$0.7 < (RR+RF)/(RR-RF) < 2.0 \tag{10}$$

where RF denotes a radius of curvature of the object side surface of the positive lens element in the fifth lens group, and RR denotes a radius of curvature of an image side surface of the positive lens element in the fifth lens group.

By constructing the zoom lens system according to the first embodiment of the present invention like this, the number of lens elements constructing the zoom lens system can be reduced.

Conditional expression (10) defines an appropriate range of the radius of curvature of the single positive lens element in the fifth lens group. When the ratio (RR+RF)/(RR–RF) exceeds the upper limit of conditional expression (10), or when the ratio falls below the lower limit of conditional expression (10), variation in various aberrations accompanying with focusing increases, so that it is undesirable.

Each example according to the first embodiment of the present invention is going to be explained below with reference to accompanying drawings.

The zoom lens system according to each example of the first embodiment is composed of, in order from an object, a first lens group G1 having positive refractive power, a second lens group G2 having negative refractive power, a third lens group G3 having positive refractive power, a fourth lens group G4 having positive refractive power, and a fifth lens group G5 having positive refractive power. The third lens group G3 has an aperture stop S.

When the state of lens group positions varies from the wide-angle end state to the telephoto end state, the first lens group G1, the third lens group G3, and the fourth lens group G4 move to the object side such that a separation between the first lens group G1 and the second lens group G2 increases, a separation between the second lens group G2 and the third lens group G3 decreases, a separation between the third lens group G3 and the fourth lens group G4 varies, and a separation between the fourth lens group G4 and the fifth lens group G5 increases.

When the state of lens group positions varies from the wide-angle end state to the telephoto end state, the second lens group G2 is moved such that the position of the second lens group G2 in the telephoto end state is to the image side of the position of the second lens group G2 in the wide-angle end state, and the fifth lens group G5 is fixed.

In the zoom lens system, focusing from infinity to a close object is carried out by moving the fifth lens group G5 to the object side.

The zoom lens system has a low-pass filter P1 and a cover glass P2 between the fifth lens group G5 and an image plane I. The low-pass filter P1 has a purpose of cutting off a higher spatial frequency than the resolution limit of the imaging device such as a CCD located in the image plane I. The cover glass P2 has a purpose of protecting the imaging device.

EXAMPLE 1

FIG. 1 is a diagram showing the lens arrangement of a zoom lens system according to Example 1 of a first embodiment of the present invention together with movement of each lens group upon zooming from a wide-angle end state (W) to a telephoto end state (T).

In the zoom lens system according to Example 1 of the first embodiment, the first lens group is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 is composed of, in order from the object, a negative meniscus lens L21 having a convex surface facing to the object, a cemented lens constructed by a double concave negative lens L22 cemented with a positive meniscus lens L23 having a convex surface facing to the object, and a positive meniscus lens L24 having a convex surface facing to the object.

The third lens group G3 is composed of, in order from the object, a double convex positive lens L31, a positive meniscus lens L32 having a convex surface facing to the object, and a double concave negative lens L33.

The fourth lens group G4 is composed of, in order from the object, a cemented lens constructed by a negative meniscus lens L41 having a convex surface facing to the object cemented with a double convex positive lens L42.

The fifth lens group G5 is composed of, in order from the object, a cemented lens constructed by a double convex positive lens L51 cemented with a double concave negative lens L52.

In the zoom lens system according to each example of the first embodiment, any lens surface in the first lens group G1 through the fifth lens group G5 may be an aspherical surface or a diffractive surface.

In the zoom lens system according to each example of the first embodiment, any lens element in the first lens group G1 through the fifth lens group G5 may be a graded index lens (GRIN lens) or a plastic lens.

In the zoom lens system according to each example of the first embodiment, focusing is carried out by moving the fifth lens element. However, focusing is not limited to this way and may be carried out by any other way such as moving the first lens group G1, moving the second lens group G2, moving the first and second lens groups at a time, or moving the whole lens system.

In the zoom lens system according to each example of the first embodiment, image blurring caused by a camera shake may be corrected by moving any one lens group of the first lens group G1 through the fifth lens group G5 or a portion of lens group in a lens group perpendicular to the optical axis.

Various values associated with Example 1 are listed in Table 1. In "Specifications", F denotes the focal length of the zoom lens system, FNO denotes the f-number, 2A denotes the maximum angle of view (unit: degree). In "Lens Data", the number in the left side column denotes surface number in order from the object, r denotes radius of curvature of each optical surface, d denotes a separation along the optical axis between adjacent optical surfaces, ν denotes Abbe number of a medium between adjacent optical surfaces, n denotes refractive index of a medium between adjacent optical surfaces at d-line ($\lambda$=587.6 nm), and refractive index of the air 1.000000 is abbreviated.

Aspherical surfaces are expressed by the following expression;

$$X(y)=y^2/[r\cdot\{1+(1-Ky^2/r^2)^{1/2}\}]+C4y^4+C6y^6+C8\cdot y^8+C10^{10}$$

where X(y) denotes the distance along the optical axis from the tangent plane on the vertex of the aspherical surface to the position of the aspherical surface at the height of y from the optical axis, r denotes a paraxial radius of curvature, K denotes the conical coefficient, and Ci denotes an i-th order aspherical coefficient.

In aspherical data, E-n denotes "$\times 10^{-n}$". For example, 1.234E-5 denotes $1.234\times 10^{-5}$.

In "variable intervals upon zooming", variable intervals and the focal length F in the wide-angle end state (W), in the intermediate focal length state (M), and in the telephoto end state (T) when focusing at infinity are shown, respectively. Moreover, a shooting magnification β and variable intervals in each state when focusing at a close object are shown, respectively. The reference symbol R denotes a shooting distance between an object and an image plane.

In the tables for various values, "mm" is generally used for the unit of length such as the focal length, the radius of curvature, and the separation between optical surfaces. However, since an optical system proportionally enlarged or reduced its dimension can be obtained similar optical performance, the unit is not necessary to be limited to "mm" and any other suitable unit can be used.

The above-mentioned explanation can be applied to any other examples in the present invention.

TABLE 1

(Specifications)

|  | W | M | T |
|---|---|---|---|
| F: | 9.168 | 26.981 | 69.068 |
| FNO | 2.89 | 3.87 | 4.44 |
| 2A: | 66.22° | 23.66° | 9.32° |

(Lens Data)

| surface number | r | d | ν | n |
|---|---|---|---|---|
| 1 | 112.4351 | 1.3000 | 23.78 | 1.846660 |
| 2 | 46.6040 | 4.1000 | 47.38 | 1.788000 |
| 3 | −1133.2893 | 0.1000 | | |
| 4 | 33.8557 | 3.1500 | 82.52 | 1.497820 |
| 5 | 95.7487 | (d5) | | |
| 6 | 108.3076 | 1.2000 | 46.58 | 1.804000 |
| 7 | 10.0068 | 4.3000 | | |
| 8 | −29.0221 | 0.9000 | 54.66 | 1.729160 |
| 9 | 21.5697 | 1.7000 | 23.78 | 1.846660 |
| 10 | 36.0418 | 0.7000 | | |
| 11 | 22.2130 | 2.1000 | 23.78 | 1.846660 |
| 12 | 133.9390 | (d12) | | |
| 13 | ∞ | 0.5000 | Aperture Stop S | |

TABLE 1-continued

| 14 | 19.0286  | 3.0500 | 82.52 | 1.497820 |
|----|----------|--------|-------|----------|
| 15 | −26.3022 | 0.2000 |       |          |
| 16 | 14.4696  | 4.9000 | 47.82 | 1.757000 |
| 17 | 43.2842  | 0.7500 |       |          |
| 18 | −27.1397 | 0.9000 | 31.09 | 1.688930 |
| 19 | 15.2385  | (d19)  |       |          |
| 20 | 28.7363  | 0.9000 | 42.72 | 1.834810 |
| 21 | 10.1303  | 3.8500 | 58.96 | 1.518230 |
| 22 | 21.2189  | (d22)  |       |          |
| 23 | 27.6733  | 3.0000 | 46.58 | 1.804000 |
| 24 | −78.3460 | 1.0000 | 23.78 | 1.846660 |
| 25 | 103.6796 | (d25)  |       |          |
| 26 | ∞        | 2.7600 | 64.22 | 1.516330 |
| 27 | ∞        | 2.4700 |       |          |
| 28 | ∞        | 0.5000 | 64.22 | 1.516330 |
| 29 | ∞        |        |       |          |

(Variable Intervals upon Zooming)
<Focusing at infinity: R = ∞ >

|     | W        | M        | T        |
|-----|----------|----------|----------|
| F   | 9.16799  | 26.98070 | 69.06823 |
| d5  | 1.69782  | 17.46605 | 30.94475 |
| d12 | 27.10947 | 11.22596 | 2.57196  |
| d19 | 6.24109  | 1.31510  | 1.40850  |
| d22 | 2.37220  | 17.37598 | 24.45608 |
| d25 | 5.56357  | 5.56357  | 5.56357  |

<Focusing at a close object: R = 500>

|     | W        | M        | T        |
|-----|----------|----------|----------|
| β   | −0.02111 | −0.05746 | −0.12550 |
| d5  | 1.69782  | 17.46605 | 30.94475 |
| d12 | 27.10947 | 11.22596 | 2.57196  |
| d19 | 6.24109  | 1.31510  | 1.40850  |
| d22 | 1.99490  | 14.55056 | 11.91493 |
| d25 | 5.94087  | 8.38899  | 18.10472 |

(Values for the conditional expressions)

| (1) | F1/FW = 6.607            |
| (2) | \|F2/FW\| = 1.306         |
| (3) | F3/FW = 2.774            |
| (4) | F4/FW = 4.862            |
| (5) | (D34W − D34T)/FW = 0.527 |
| (6) | M1/FW = 2.395            |
| (7) | N4N−N4P = 0.317          |
| (8) | F5/FW = 5.220            |
| (9) | ν5P − ν5N = 22.80        |

Figure 2A:
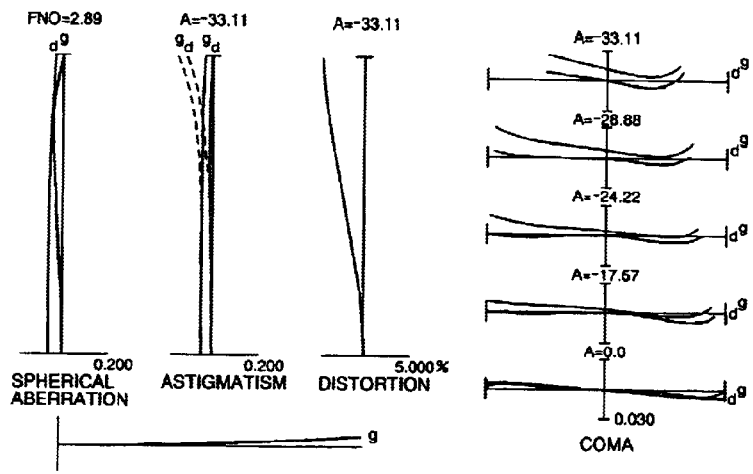
FIGS. 2A to 2C graphically show various aberrations of the zoom lens system according to Example 1 of the first embodiment in a wide-angle end state, an intermediate focal length state, and a telephoto end state, respectively, when the system is focused at infinity.
Figure 2B:
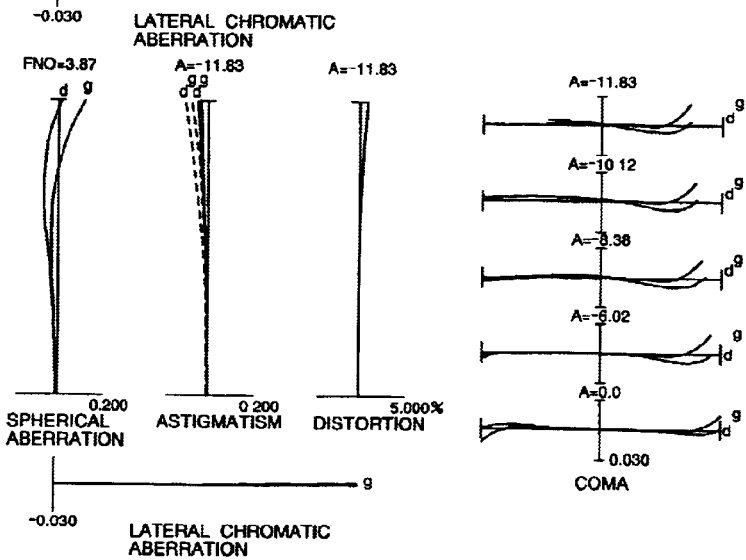
Figure 2C:
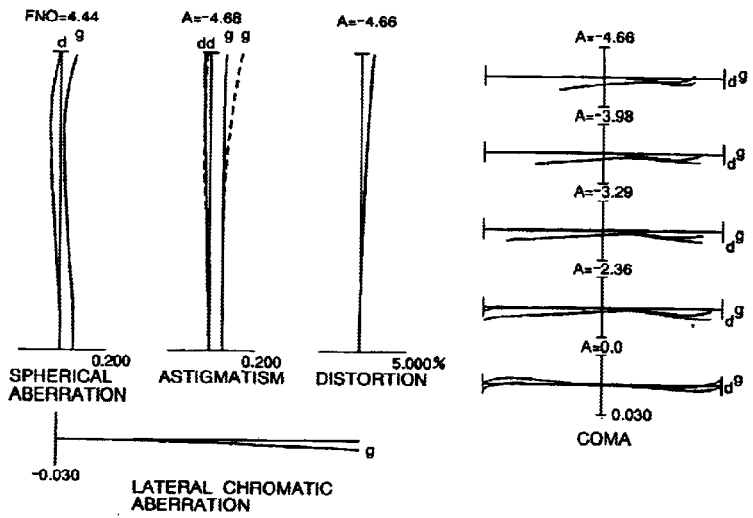

FIGS. 2A to 2C graphically show various aberrations of the zoom lens system according to Example 1 of the first embodiment in the wide-angle end state, an intermediate focal length state, and the telephoto end state, respectively, when focusing at infinity.

Figure 3A:
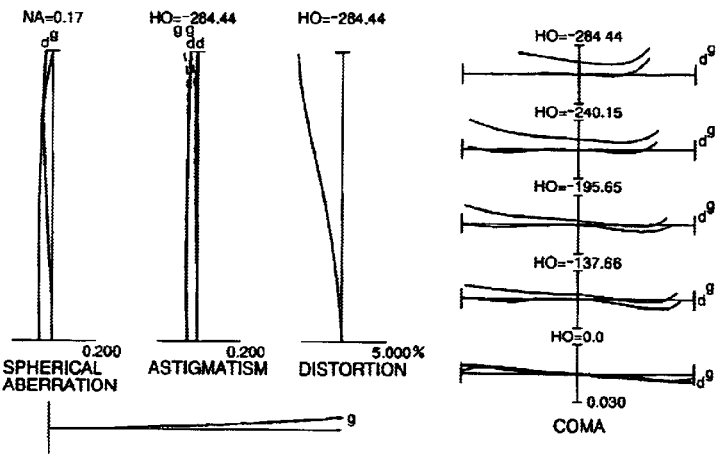
FIGS. 3A to 3C graphically show various aberrations of the zoom lens system according to Example 1 of the first embodiment in the wide-angle end state, the intermediate focal length state, and the telephoto end state, respectively, when the system is focused at a close distance.
Figure 3B:
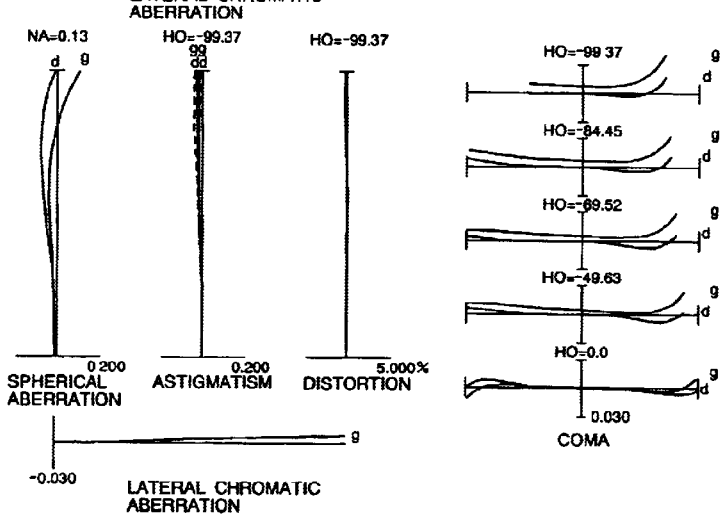
Figure 3C:
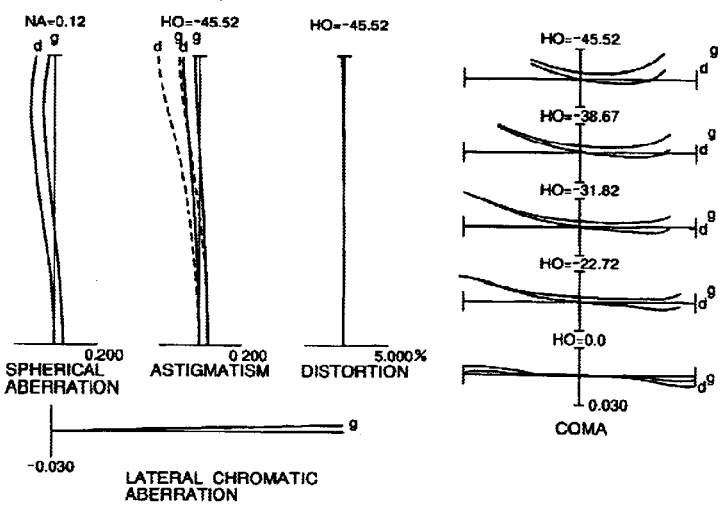

FIGS. 3A to 3C graphically show various aberrations of the zoom lens system according to Example 1 of the first embodiment in the wide-angle end state, an intermediate focal length state, and the telephoto end state, respectively, when focusing at a close object.

In aberration graphs of all examples, FNO denotes the f-number, NA denotes the numerical aperture, A denotes a half angle of view, HO denotes an object height. In particular, in the graphs shown spherical aberration, astigmatism, and distortion, HO denotes the maximum value of the object height. In the graphs shown coma, H0 denotes each half angle of view or each object height. In respective graphs, d denotes an aberration curve at d-line (λ=587.6 nm), and g denote that at g-line (λ=435.8 nm). In the graphs showing spherical aberration, a solid line indicates spherical aberration. In the graphs showing astigmatism, a solid line indicates a sagittal image plane, and a broken line indicates a meridional image plane.

As is apparent from the respective graphs showing various aberrations, excellent compensation is made for various aberrations to accomplish high optical performance.

EXAMPLE 2

Figure 4:
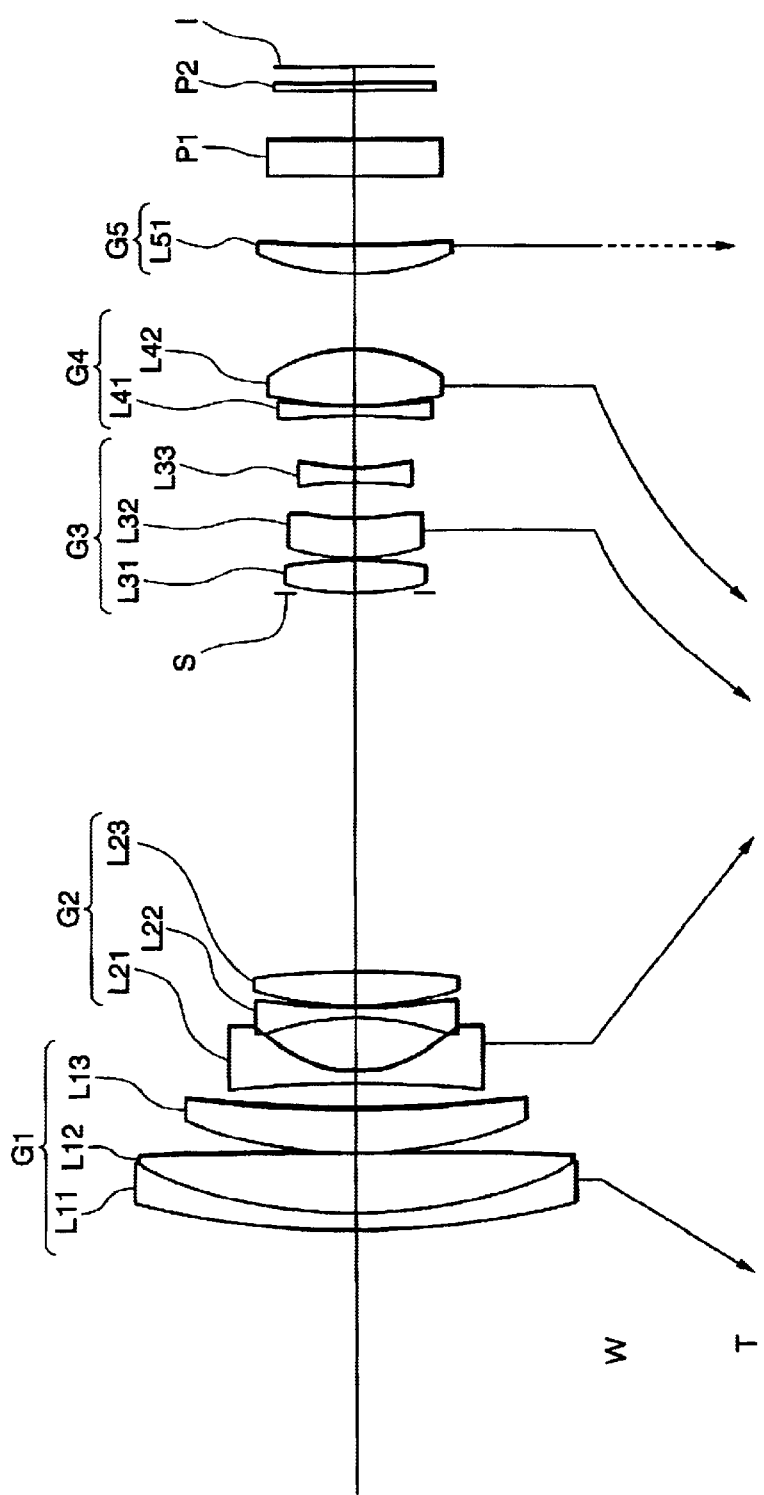
FIG. 4 is a diagram showing the lens arrangement of a zoom lens system according to Example 2 of the first embodiment of the present invention together with movement of each lens group upon zooming.

FIG. 4 is a diagram showing the lens arrangement of a zoom lens system according to Example 2 of the first embodiment of the present invention together with movement of each lens group upon zooming from a wide-angle end state (W) to a telephoto end state (T).

In the zoom lens system according to Example 2 of the first embodiment, the first lens group is composed of, in order from the object, a cemented lens constructed by a negative meniscus lens L11 having a convex surface facing to the object cemented with a double convex positive lens L12, and a positive meniscus lens L13 having a convex surface.

The second lens group G2 is composed of, in order from the object, a double concave negative lens L21 having an aspherical surface facing to the object, a double concave negative lens L22, and a double convex positive lens L23.

The third lens group G3 is composed of, in order from the object, a double convex positive lens L31, a positive meniscus lens L32 having a convex surface facing to the object, and a double concave negative lens L33.

The fourth lens group G4 is composed of, in order from the object, a double concave negative lens L41 and a double convex positive lens L42 having an aspherical surface facing to the object.

The fifth lens group G5 is composed of a positive meniscus lens L51 having a convex surface facing to the object various values associated with Example 2 are listed in Table 2.

TABLE 2

(Specifications)

|     | W      | M      | T      |
|-----|--------|--------|--------|
| F:  | 9.360  | 27.000 | 69.000 |
| FNO | 2.88   | 3.77   | 4.07   |
| 2A: | 65.02° | 23.50° | 9.28°  |

(Lens Data)

| surface number | r         | d       | ν     | n        |
|----------------|-----------|---------|-------|----------|
| 1              | 73.6667   | 1.1000  | 23.78 | 1.846660 |
| 2              | 37.9880   | 4.5000  | 52.32 | 1.755000 |
| 3              | −824.1852 | 0.1000  |       |          |
| 4              | 34.0886   | 3.3000  | 81.61 | 1.497000 |
| 5              | 105.6423  | (d5)    |       |          |
| 6              | −59.1801  | 0.9500  | 49.61 | 1.772500 |
| 7              | 10.4970   | 4.0000  |       |          |
| 8              | −22.0824  | 0.8000  | 55.52 | 1.696800 |
| 9              | 68.0177   | 0.1000  |       |          |
| 10             | 27.7359   | 2.4500  | 23.78 | 1.846660 |
| 11             | −72.9332  | (d11)   |       |          |
| 12             | ∞         | 0.5000  | Aperture Stop S | |
| 13             | 15.1627   | 2.3500  | 81.61 | 1.497000 |
| 14             | −30.7859  | 0.1000  |       |          |
| 15             | 14.1059   | 3.5000  | 61.18 | 1.589130 |
| 16             | 29.7859   | 2.7500  |       |          |
| 17             | −16.9676  | 0.8000  | 42.72 | 1.834810 |
| 18             | 25.0000   | (d18)   |       |          |
| 19             | −57.6997  | 0.8000  | 23.78 | 1.846660 |
| 20             | 42.5657   | 0.1000  |       |          |
| 21             | 22.1806   | 4.1500  | 61.18 | 1.589130 |
| 22             | −11.9098  | (d22)   |       |          |

TABLE 2-continued

| 23 | 20.1476 | 2.0000 | 70.24 | 1.487490 |
|---|---|---|---|---|
| 24 | 112.4017 | (d24) | | |
| 25 | ∞ | 2.7600 | 64.10 | 1.516800 |
| 26 | ∞ | 4.0000 | | |
| 27 | ∞ | 0.5000 | 64.10 | 1.516800 |
| 28 | ∞ | | | |

(Aspherical Surface Data)
Surface Number = 6

| κ | = 11.0000 |
|---|---|
| C4 | = 5.02380E−5 |
| C6 | = −2.18250E−7 |
| C8 | = 1.31130E−9 |
| C10 | = −4.16760E−12 |

Surface Number = 21

| κ | = 4.5188 |
|---|---|
| C4 | = −2.23320E−4 |
| C6 | = 6.19820E−7 |
| C8 | = −1.31180E−9 |
| C10 | = −8.16860E−11 |

(Variable Intervals upon Zooming)
<Focusing at infinity: R = ∞>

| | W | M | T |
|---|---|---|---|
| F | 9.36000 | 27.00008 | 69.00048 |
| d5 | 2.05413 | 14.04899 | 25.13447 |
| d11 | 28.67091 | 11.47892 | 0.30000 |
| d18 | 4.09762 | 1.20272 | 1.00557 |
| d22 | 5.73479 | 17.94303 | 21.88218 |
| d24 | 5.17856 | 5.17856 | 5.17356 |

<Focusing at a close object: R = 500>

| | W | M | T |
|---|---|---|---|
| β | −0.02144 | −0.05711 | −0.12719 |
| d5 | 2.05413 | 14.04899 | 25.13447 |
| d11 | 28.67091 | 11.47892 | 0.30000 |
| d18 | 4.09762 | 1.20272 | 1.00557 |
| d22 | 5.32209 | 14.99350 | 8.77076 |
| d24 | 5.59126 | 8.12809 | 18.28998 |

(Values for the conditional expressions)

| (1) | F1/FW = 5.395 |
|---|---|
| (2) | |F2/FW| = 1.294 |
| (3) | F3/FW = 3.845 |
| (4) | F4/FW = 2.479 |
| (5) | (D34W − D34T)/FW = 0.330 |
| (6) | M1/FW = 0.829 |
| (8) | F5/FW = 5.342 |
| (10) | (RR + RF)/(RR − RF) = 1.437 |

Figure 5A:
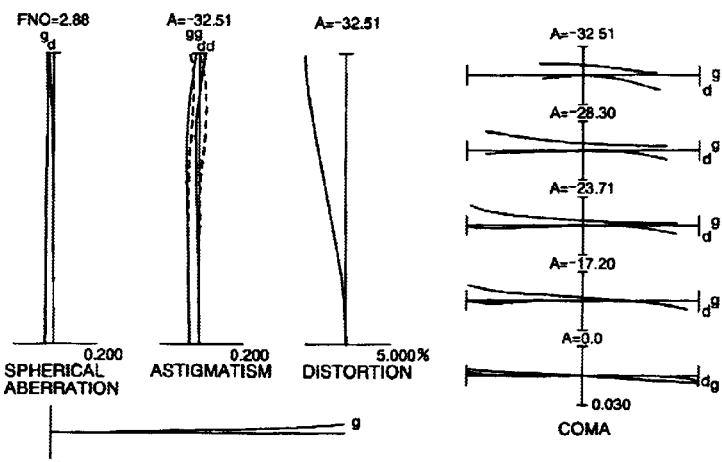
FIGS. 5A to 5C graphically show various aberrations of the zoom lens system according to Example 2 of the first embodiment in the wide-angle end state, the intermediate focal length state, and the telephoto end state, respectively, when the system is focused at infinity.
Figure 5B:
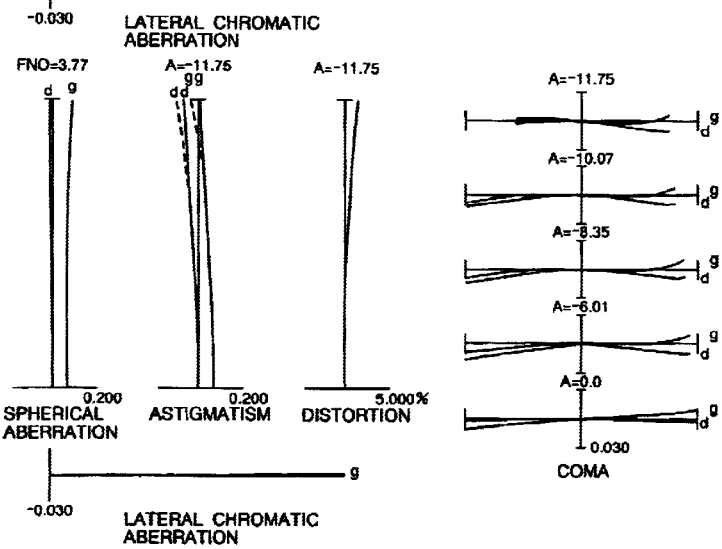
Figure 5C:
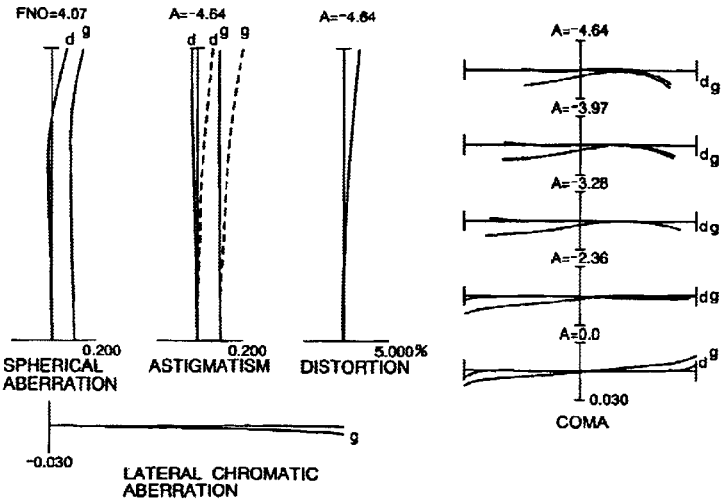

FIGS. 5A to 5C graphically show various aberrations of the zoom lens system according to Example 2 of the first embodiment in the wide-angle end state, an intermediate focal length state, and the telephoto end state, respectively, when focusing at infinity.

Figure 6A:
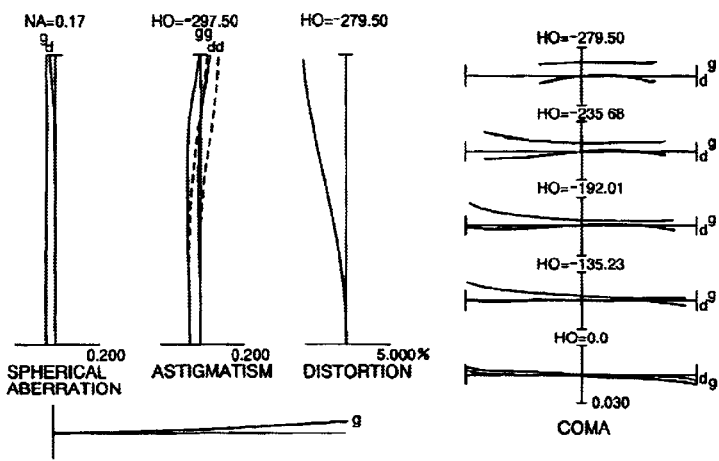
FIGS. 6A to 6C graphically show various aberrations of the zoom lens system according to Example 2 of the first embodiment in the wide-angle end state, the intermediate focal length state, and the telephoto end state, respectively, when the system is focused at a close distance.
Figure 6B:
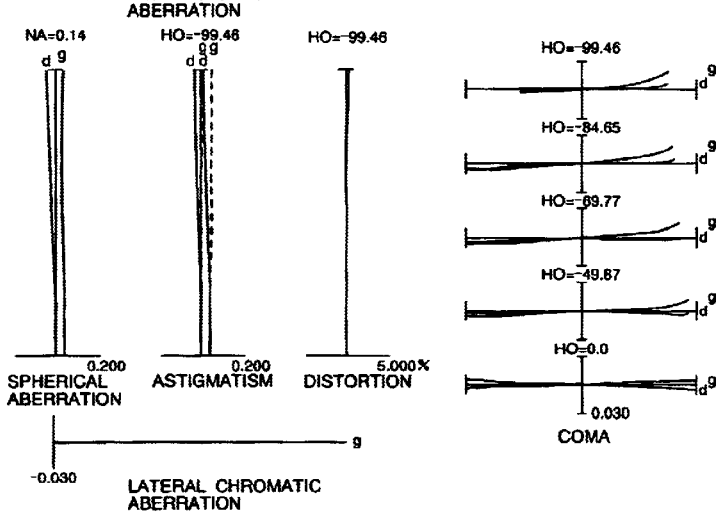
Figure 6C:
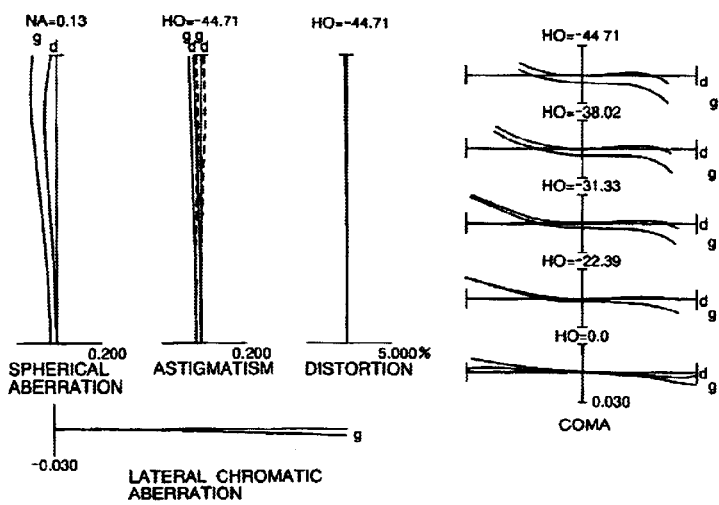

FIGS. 6A to 6C graphically show various aberrations of the zoom lens system according to Example 2 of the first embodiment in the wide-angle end state, an intermediate focal length state, and the telephoto end state, respectively, when focusing at a close object.

As is apparent from the respective graphs showing various aberrations, excellent compensation is made for various aberrations to accomplish high optical performance.

EXAMPLE 3

Figure 7:
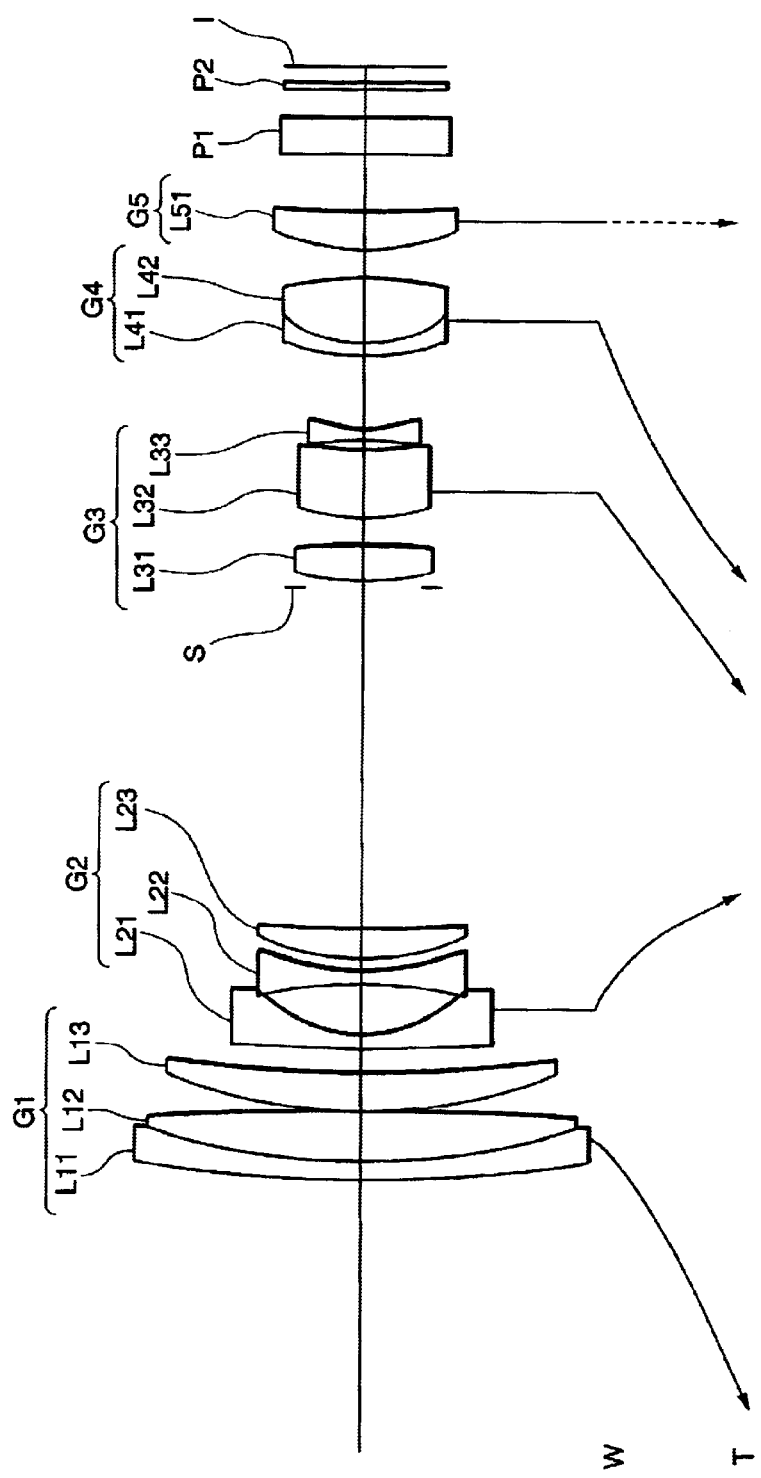
FIG. 7 is a diagram showing the lens arrangement of a zoom lens system according to Example 3 of the first embodiment of the present invention together with movement of each lens group upon zooming.

FIG. 7 is a diagram showing the lens arrangement of a zoom lens system according to Example 3 of the first embodiment of the present invention together with movement of each lens group upon zooming from a wide-angle end state (W) to a telephoto end state (T).

In the zoom lens system according to Example 3 of the first embodiment, the first lens group G1 is composed of, in order from the object, a cemented lens constructed by a negative meniscus lens L11 having a convex surface facing to the object cemented with a double convex positive lens L12, and a positive meniscus lens L13 having a convex surface The second lens group G2 is composed of, in order from the object, a negative meniscus lens L21 having a convex surface facing to the object, a double concave negative lens L22, and a positive meniscus lens L23 having a convex surface facing to the object.

The third lens group G3 is composed of, in order from the object, a double convex positive lens L31, a positive meniscus lens L32 having a convex surface facing to the object, and a double concave negative lens L33.

The fourth lens group G4 is composed of, in order from the object, a cemented lens constructed by a negative meniscus lens L41 having a convex surface facing to the object cemented with a double convex positive lens L42 having an aspherical surface facing to the image.

The fifth lens group G5 is composed of a positive meniscus lens L51 having a convex surface facing to the object.

Various values associated with Example 3 are listed in Table 3.

TABLE 3

(Specifications)

| | W | M | T |
|---|---|---|---|
| F: | 9.170 | 26.972 | 69.042 |
| FNO | 2.94 | 3.86 | 4.60 |
| 2A: | 65.98° | 23.32° | 9.26° |

(Lens Data)

| surface number | r | d | ν | n |
|---|---|---|---|---|
| 1 | 113.3025 | 1.3000 | 23.78 | 1.846660 |
| 2 | 54.6061 | 3.8163 | 54.66 | 1.729160 |
| 3 | −360.8574 | 0.1000 | | |
| 4 | 39.1502 | 2.9619 | 81.61 | 1.497000 |
| 5 | 109.2867 | (d5) | | |
| 6 | 152.0085 | 1.2000 | 46.58 | 1.804000 |
| 7 | 10.7469 | 3.8839 | | |
| 8 | −31.5152 | 1.0000 | 60.09 | 1.640000 |
| 9 | 20.2609 | 0.9427 | | |
| 10 | 18.8173 | 2.2482 | 23.78 | 1.846660 |
| 11 | 171.9617 | (d11) | | |
| 12 | ∞ | 0.5000 | Aperture Stop S | |
| 13 | 20.7359 | 2.8563 | 81.61 | 1.497000 |
| 14 | −34.7880 | 2.0251 | | |
| 15 | 12.0905 | 5.5000 | 50.24 | 1.719990 |
| 16 | 34.4953 | 0.7228 | | |
| 17 | −39.2689 | 0.9000 | 29.23 | 1.721510 |
| 18 | 10.9866 | (d18) | | |
| 19 | 17.9774 | 0.9000 | 42.72 | 1.834810 |
| 20 | 9.2340 | 5.0457 | 59.44 | 1.583130 |
| 21 | −31.1087 | (d21) | | |
| 22 | 20.2266 | 2.9734 | 70.24 | 1.487490 |
| 23 | 319.8053 | (d23) | | |
| 24 | 2.7600 | 64.22 | 1.516330 | |
| 25 | ∞ | 2.0000 | | |
| 26 | ∞ | 0.5000 | 64.22 | 1.516330 |
| 27 | ∞ | | | |

TABLE 3-continued (Aspherical Surface Data)
Surface Number = 21

| κ   | = 1.000        |
|-----|----------------|
| C4  | = 2.34800E−5   |
| C6  | = −7.23530E−7  |
| C8  | = 2.67940E−8   |
| C10 | = −5.48510E−10 |

(Variable Intervals upon Zooming)
<Focusing at infinity: R = ∞>

|     | W        | M        | T        |
|-----|----------|----------|----------|
| F   | 9.17034  | 26.97238 | 69.04205 |
| d5  | 2.00000  | 19.85258 | 33.07754 |
| d11 | 27.01938 | 11.29750 | 2.05000  |
| d18 | 5.66133  | 1.57321  | 1.21501  |
| d21 | 2.39541  | 14.25610 | 22.68458 |
| d23 | 4.42781  | 4.42781  | 4.42781  |

<Focusing at a close object: R = 500>

|     | W        | M        | T        |
|-----|----------|----------|----------|
| β   | −0.02101 | −0.05630 | 0.−12209 |
| d5  | 2.00000  | 19.35258 | 33.07754 |
| d11 | 27.01938 | 11.29750 | 2.05000  |
| d18 | 5.66133  | 1.57321  | 1.21501  |
| d21 | 1.99947  | 11.37514 | 10.32270 |
| d23 | 4.82375  | 7.30877  | 16.78969 |

(Values for the conditional expressions)

| (1)  | F1/FW = 7.036              |
| (2)  | \| F2/FW \| = 1.381        |
| (3)  | F3/FW = 3.119              |
| (4)  | F4/FW = 2.952              |
| (5)  | (D34W − D34T)/FW = 0.484   |
| (6)  | M1/FW = 2.393              |
| (7)  | N4N − N4P = 0.252          |
| (8)  | F5/FW = 4.815              |
| (10) | (RR + RF)/(RR − RF) = 1.135 |

Figure 8A:
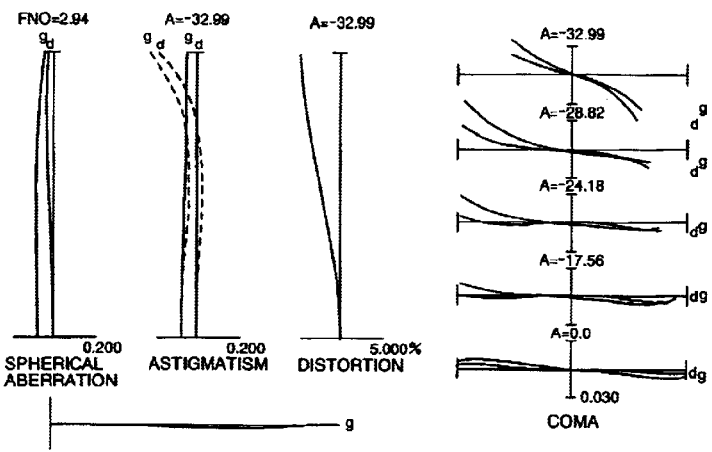
FIGS. 8A to 8C graphically show various aberrations of the zoom lens system according to Example 3 of the first embodiment in the wide-angle end state, the intermediate focal length state, and the telephoto end state, respectively, when the system is focused at infinity.
Figure 8B:
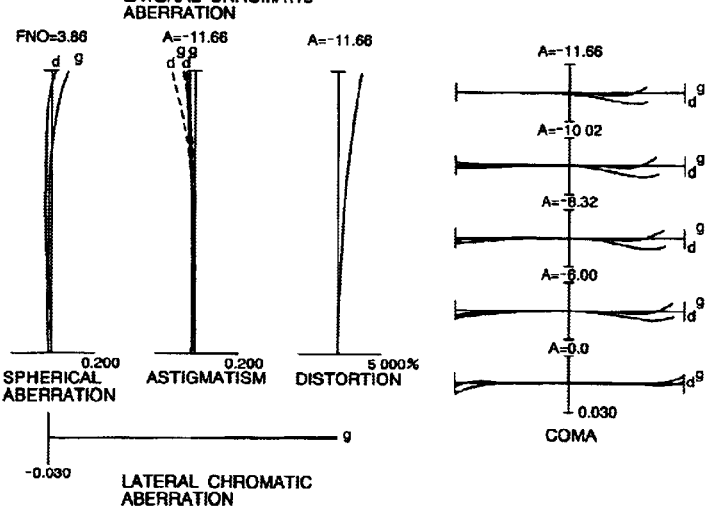
Figure 8C:
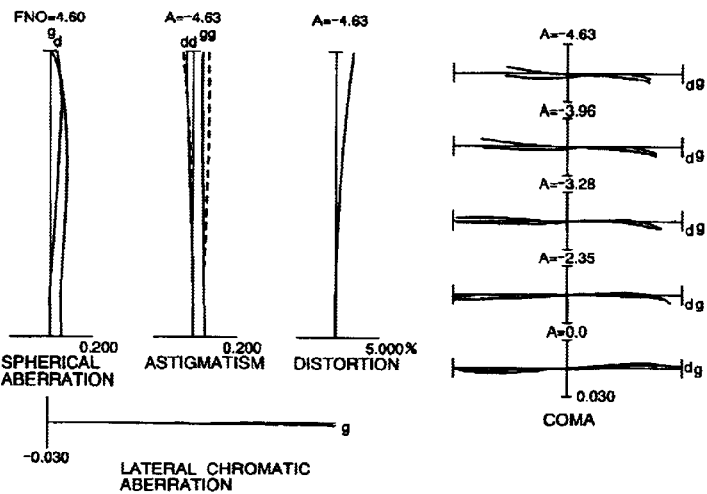
Figure 9A:
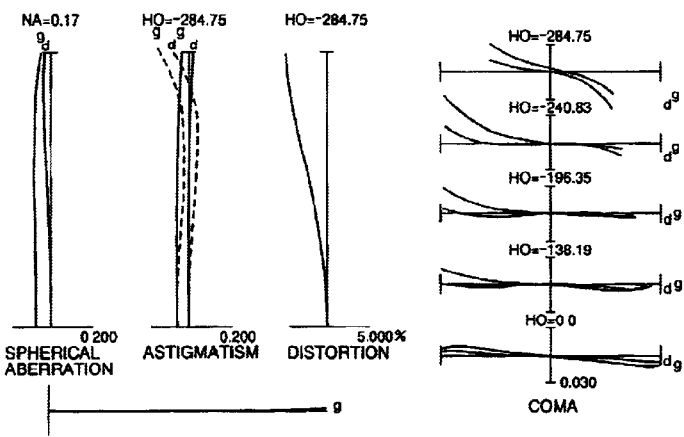
FIGS. 9A to 9C graphically show various aberrations of the zoom lens system according to Example 3 of the first embodiment in the wide-angle end state, the intermediate focal length state, and the telephoto end state, respectively, when the system is focused at a close distance.
Figure 9B:
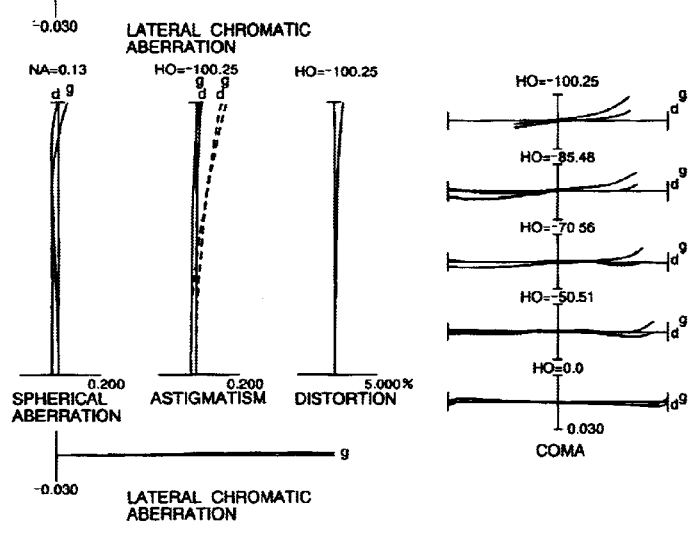
Figure 9C:
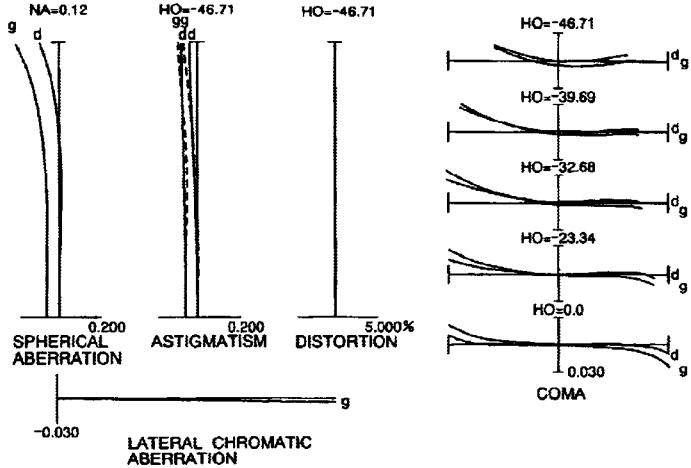

FIGS. 8A to 8C graphically show various aberrations of the zoom lens system according to Example 3 of the first embodiment in the wide-angle end state, an intermediate focal length state, and the telephoto end state, respectively, when focusing at infinity FIGS. 9A to 9C graphically show various aberrations of the zoom lens system according to Example 3 of the first embodiment in the wide-angle end state, an intermediate focal length state, and the telephoto end state, respectively, when focusing at a close object.

As is apparent from the respective graphs showing various aberrations, excellent compensation is made for various aberrations to accomplish high optical performance.

EXAMPLE 4

FIG. 10 is a diagram showing the lens arrangement of a zoom lens system according to Example 4 of the first embodiment of the present invention together with movement of each lens group upon zooming from a wide-angle end state (W) to a telephoto end state (T).

In the zoom lens system according to Example 4 of the first embodiment, the first lens group G1 is composed of, in order from the object, a cemented lens constructed by a negative meniscus lens L11 having a convex surface facing to the object cemented with a double convex positive lens L12, and a positive meniscus lens L13 having a convex surface facing to the object.

The second lens group G2 is composed of, in order from the object, a negative meniscus lens L21 having a convex surface facing to the object, a cemented lens constructed by a double concave negative lens L22 cemented with a positive meniscus lens L23 having a convex surface facing to the object, and a positive meniscus lens L24 having a convex surface facing to the object.

The third lens group G3 is composed of, in order from the object, a double convex positive lens L31, a positive meniscus lens L32 having a convex surface facing to the object, and a double concave negative lens L33.

The fourth lens group G4 is composed of, in order from the object, a cemented lens constructed by a negative meniscus lens L41 having a convex surface facing to the object cemented with a double convex positive lens L42.

The fifth lens group G5 is composed of a positive meniscus lens L51 having a convex surface facing to the object and the object side surface is an aspherical surface.

Various values associated with Example 4 are listed in Table 4.

TABLE 4

(Specifications)

|      | W      | M      | T      |
|------|--------|--------|--------|
| F:   | 9.167  | 26.980 | 69.068 |
| FNO  | 2.86   | 3.67   | 4.43   |
| 2A:  | 66.14° | 23.52° | 9.28°  |

(Lens Data)

| surface number | r        | d       | ν       | n        |
|----|-----------|---------|----------|----------|
| 1  | 98.4799   | 1.3000  | 23.78    | 1.846660 |
| 2  | 48.6631   | 3.9748  | 54.66    | 1.729160 |
| 3  | −456.9251 | 0.1000  |          |          |
| 4  | 33.6174   | 2.9436  | 81.61    | 1.497000 |
| 5  | 71.4730   | (d5)    |          |          |
| 6  | 110.5582  | 1.2000  | 46.58    | 1.804000 |
| 7  | 9.4449    | 3.7507  |          |          |
| 8  | −47.0877  | 0.9000  | 47.82    | 1.757000 |
| 9  | 13.7022   | 2.1890  | 23.78    | 1.846660 |
| 10 | 40.7557   | 0.3079  |          |          |
| 11 | 16.9759   | 1.6683  | 23.78    | 1.846660 |
| 12 | 31.3730   | (d12)   |          |          |
| 13 | ∞         | 0.5000  | Aperture Stop S | |
| 14 | 21.0685   | 2.9044  | 81.61    | 1.497000 |
| 15 | −27.0582  | 1.6547  |          |          |
| 16 | 12.8487   | 4.8132  | 49.61    | 1.772500 |
| 17 | 71.7818   | 0.5823  |          |          |
| 18 | −36.6534  | 0.9000  | 29.23    | 1.721510 |
| 19 | 10.8184   | (d19)   |          |          |
| 20 | 20.0846   | 0.9000  | 42.72    | 1.834810 |
| 21 | 10.5850   | 5.0778  | 57.77    | 1.572500 |
| 22 | −36.4940  | (d22)   |          |          |
| 23 | 20.7863   | 2.9816  | 59.44    | 1.583130 |
| 24 | 114.8135  | (d24)   |          |          |
| 25 | ∞         | 2.7600  | 64.22    | 1.516330 |
| 26 | ∞         | 2.0000  |          |          |
| 27 | ∞         | 0.5000  | 64.22    | 1.516330 |
| 28 | ∞         |         |          |          |

(Aspherical Surface Data)
Surface Number = 23

| κ   | = 1.0000       |
|-----|----------------|
| C4  | = −2.93600E−5  |
| C6  | = 1.34090E−6   |
| C8  | = −3.23510E−8  |
| C10 | = 3.13650E−10  |

TABLE 4-continued (Variable Intervals upon Zooming)
<Focusing at infinity: R = ∞ >

|    | W       | M        | T        |
|----|---------|----------|----------|
| F  | 9.16703 | 26.98028 | 69.06777 |
| d5 | 2.00000 | 19.52429 | 32.34403 |
| d12| 24.89272| 9.92521  | 2.05000  |
| d19| 9.14744 | 2.70979  | 1.24286  |
| d22| 2.40978 | 15.81241 | 24.76205 |
| d24| 3.47623 | 3.47623  | 3.47623  |

<Focusing at a close object: R = 500>

|    | W        | M        | T        |
|----|----------|----------|----------|
| β  | −0.02098 | −0.05593 | −0.12010 |
| d5 | 2.00000  | 19.52429 | 32.34403 |
| d12| 24.89272 | 9.92521  | 2.05000  |
| d19| 9.14744  | 2.70979  | 1.24286  |
| d22| 1.99779  | 12.85525 | 12.39949 |
| d24| 3.88822  | 6.43339  | 15.83879 |

(Values for the conditional expressions)

| (1)  | F1/FW = 6.932 |
| (2)  | \| F2/FW \| = 1.260 |
| (3)  | F3/FW = 3.013 |
| (4)  | F4/FW = 3.432 |
| (5)  | (D34W − D34T)/FW = 0.863 |
| (6)  | M1/FW = 2.394 |
| (7)  | N4N − N4P = 0.262 |
| (8)  | F5/FW = 4.691 |
| (10) | (RR + RF)/(RR − RF) = 1.442 |

Figure 11A:
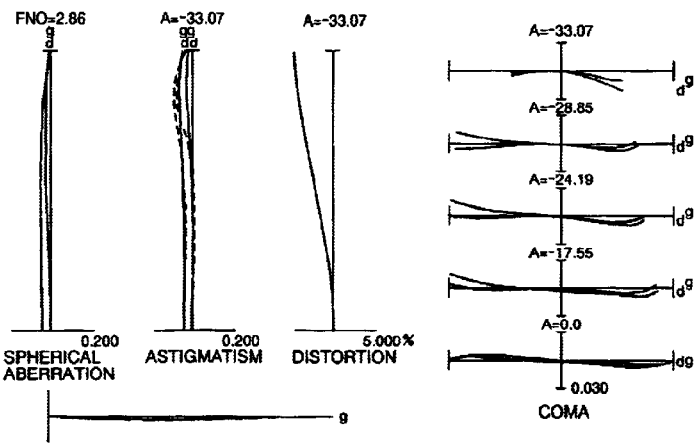
FIGS. 11A to 11C graphically show various aberrations of the zoom lens system according to Example 4 of the first embodiment in the wide-angle end state, the intermediate focal length state, and the telephoto end state, respectively, when the system is focused at infinity.
Figure 11B:
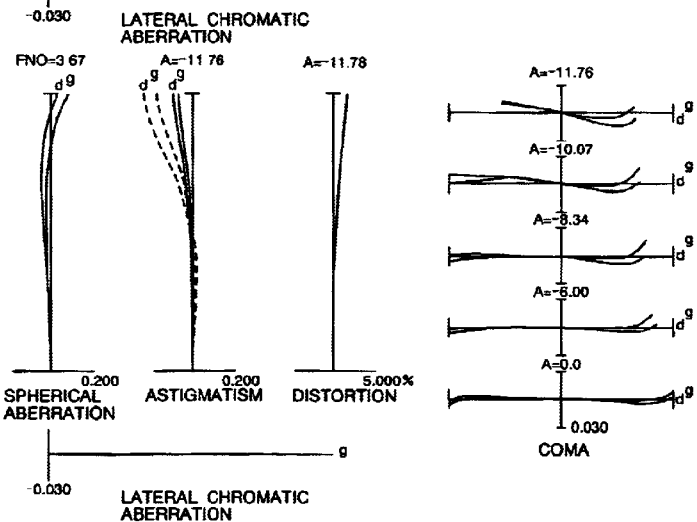
Figure 11C:
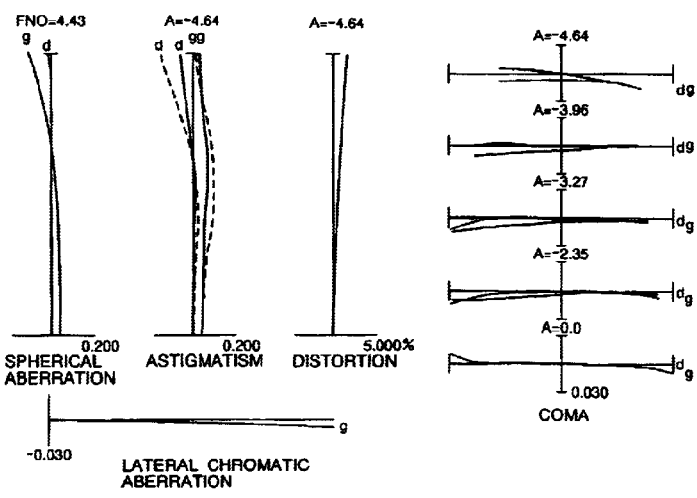

FIGS. 11A to 11C graphically show various aberrations of the zoom lens system according to Example 4 of the first embodiment in the wide-angle end state, an intermediate focal length state, and the telephoto end state, respectively, when focusing at infinity.

Figure 12A:
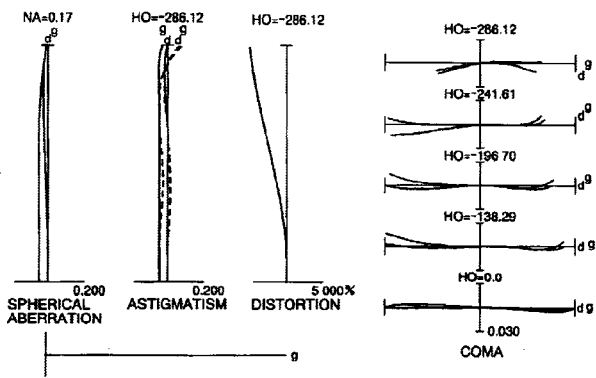
FIGS. 12A to 12C graphically show various aberrations of the zoom lens system according to Example 4 of the first embodiment in the wide-angle end state, the intermediate focal length state, and the telephoto end state, respectively, when the system is focused at a close distance.
Figure 12B:
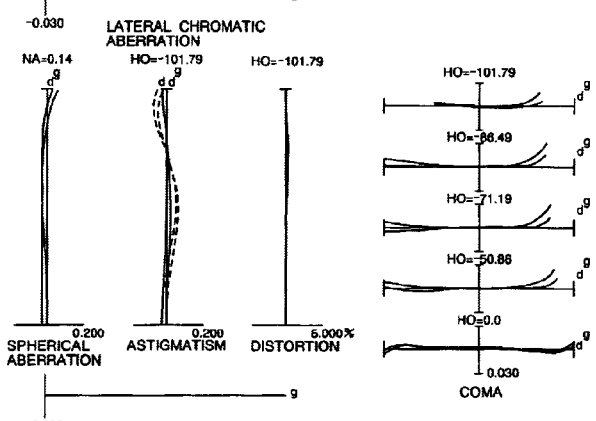
Figure 12C:
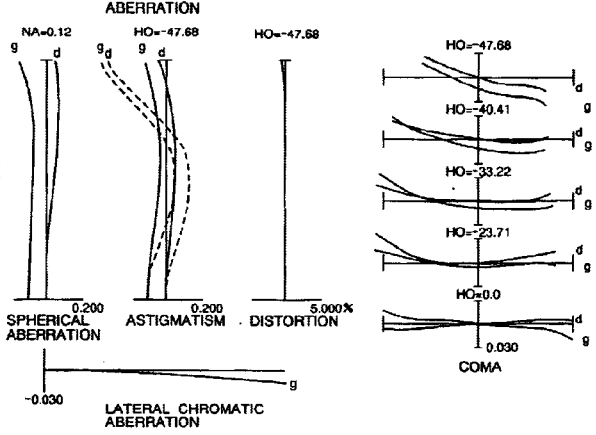

FIGS. 12A to 12C graphically show various aberrations of the zoom lens system according to Example 4 of the first embodiment in the wide-angle end state, an intermediate focal length state, and the telephoto end state, respectively, when focusing at a close object.

As is apparent from the respective graphs showing various aberrations, excellent compensation is made for various aberrations to accomplish high optical performance.

EXAMPLE 5

Figure 13:
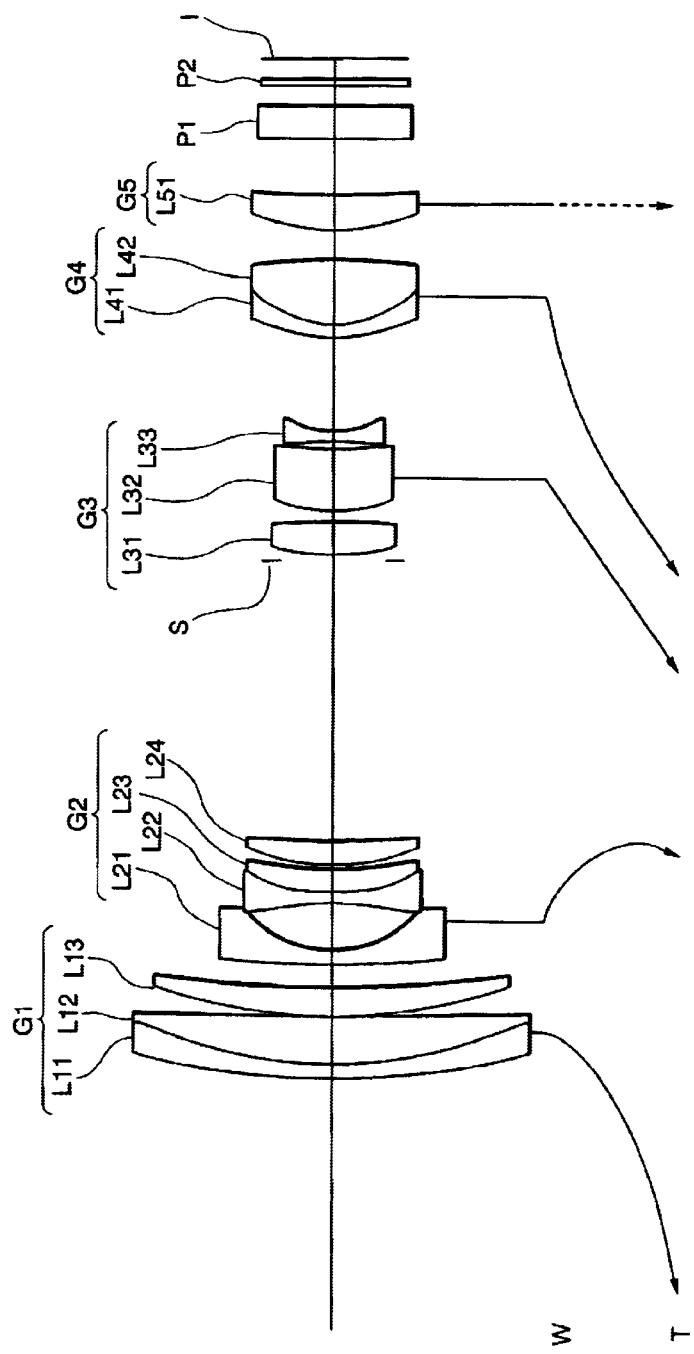
FIG. 13 is a diagram showing the lens arrangement of a zoom lens system according to Example 5 of the first embodiment of the present invention together with movement of each lens group upon zooming.

FIG. 13 is a diagram showing the lens arrangement of a zoom lens system according to Example 5 of the first embodiment of the present invention together with movement of each lens group upon zooming from a wide-angle end state (W) to a telephoto end state (T).

In the zoom lens system according to Example 5 of the first embodiment, the first lens group G1 is composed of, in order from the object, a cemented lens constructed by a negative meniscus lens L11 having a convex surface facing to the object cemented with a positive meniscus lens L12 having a convex surface facing to the object, and a positive meniscus lens L13 having a convex surface facing to the object.

The second lens group G2 is composed of, in order from the object, a negative meniscus lens L21 having a convex surface facing to the object, a cemented lens constructed by a double concave negative lens L22 cemented with a positive meniscus lens L23 having a convex surface facing to the object, and a positive meniscus lens L24 having a convex surface facing to the object.

The third lens group G3 is composed of, in order from the object, a double convex positive lens L31, a positive meniscus lens L32 having a convex surface facing to the object, and a double concave negative lens L33.

The fourth lens group G4 is composed of, in order from the object, a cemented lens constructed by a negative meniscus lens L41 having a convex surface facing to the object cemented with a double convex positive lens L42 having an aspherical surface facing to the image.

The fifth lens group G5 is composed of a double convex positive lens L51.

Various values associated with Example 5 are listed in Table 5.

TABLE 5

(Specifications)

|       | W      | M      | T      |
|-------|--------|--------|--------|
| F:    | 9.167  | 26.973 | 68.961 |
| FNO   | 2.91   | 3.86   | 4.78   |
| 2A:   | 66.16° | 23.42° | 9.30°  |

(Lens Data)

| surface number | r | d | ν | n |
|---|---|---|---|---|
| 1  | 65.2443  | 1.3000 | 23.78 | 1.846660 |
| 2  | 38.0484  | 3.9497 | 54.66 | 1.729160 |
| 3  | 741.0816 | 0.1000 | | |
| 4  | 42.9103  | 2.6091 | 81.61 | 1.497000 |
| 5  | 131.1686 | (d5)   | | |
| 6  | 115.4539 | 1.2000 | 46.58 | 1.804000 |
| 7  | 9.5044   | 3.8515 | | |
| 8  | −33.0080 | 0.9000 | 47.82 | 1.757000 |
| 9  | 15.6335  | 1.9495 | 23.78 | 1.846660 |
| 10 | 41.6939  | 0.4744 | | |
| 11 | 19.6682  | 2.0045 | 23.78 | 1.846660 |
| 12 | 55.7797  | (d12)  | | |
| 13 | ∞        | 0.5000 | Aperture Stop S | |
| 14 | 23.2401  | 2.8679 | 81.61 | 1.497000 |
| 15 | 27.1245  | 0.7777 | | |
| 16 | 12.3243  | 5.5000 | 49.61 | 1.772500 |
| 17 | 31.6608  | 0.7007 | | |
| 18 | 47.5984  | 0.9000 | 29.23 | 1.721510 |
| 19 | 10.3567  | (d19)  | | |
| 20 | 16.9393  | 0.9000 | 42.72 | 1.834810 |
| 21 | 9.1091   | 5.7413 | 59.44 | 1.583130 |
| 22 | 33.9323  | (d22)  | | |
| 23 | 21.5918  | 2.9734 | 70.24 | 1.487490 |
| 24 | −896.4692| (d24)  | | |
| 25 | ∞        | 2.7600 | 64.22 | 1.516330 |
| 26 | ∞        | 2.0000 | | |
| 27 | ∞        | 0.5000 | 64.22 | 1.516330 |
| 28 | ∞        | | | |

(Aspherical Surface Data)
Surface Number = 22

| κ   | = 1.000 |
| C4  | = 1.88310E−5 |
| C6  | = −1.49970E−6 |
| C8  | = 4.85560E−8 |
| C10 | = −7.03600E−10 |

(Variable Intervals upon Zooming)
<Focusing at infinity: R = ∞ >

|    | W       | M        | T        |
|----|---------|----------|----------|
| F  | 9.16747 | 26.97313 | 68.96125 |
| d5 | 2.00000 | 17.94592 | 29.72195 |
| d12| 24.16348| 9.87549  | 2.05000  |
| d19| 7.98471 | 2.81134  | 1.24433  |
| d22| 2.39407 | 15.56902 | 25.47698 |
| d24| 4.59594 | 4.59594  | 4.59594  |

TABLE 5-continued

<Focusing at a close object: R = 500 >

|  | W | M | T |
|---|---|---|---|
| β | −0.02099 | −0.05642 | −0.12211 |
| d5 | 2.00000 | 17.94592 | 29.72195 |
| d12 | 24.16348 | 9.87549 | 2.05000 |
| d19 | 7.98471 | 2.81134 | 1.24433 |
| d22 | 2.00194 | 12.70436 | 13.24753 |
| d24 | 4.98807 | 7.46060 | 16.82539 |

(Values for the conditional expressions)

| (1) | F1/FW = 6.555 |
| (2) | \| F2/FW \| = 1.246 |
| (3) | F3/FW = 3.013 |
| (4) | F4/VW = 2.893 |
| (5) | (D34W − D34T)/FW = 0.735 |
| (6) | M1/FW = 2.400 |
| (7) | N4N − N4P = 0.252 |
| (8) | F5/FW = 4.722 |
| (10) | (RR + RF)/(RR − RF) = 0.953 |

Figure 14A:
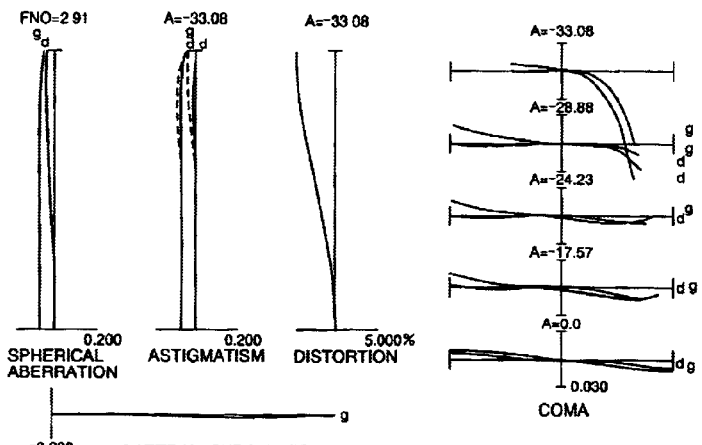
FIGS. 14A to 14C graphically show various aberrations of the zoom lens system according to Example 5 of the first embodiment in the wide-angle end state, the intermediate focal length state, and the telephoto end state, respectively, when the system is focused at infinity.
Figure 14B:
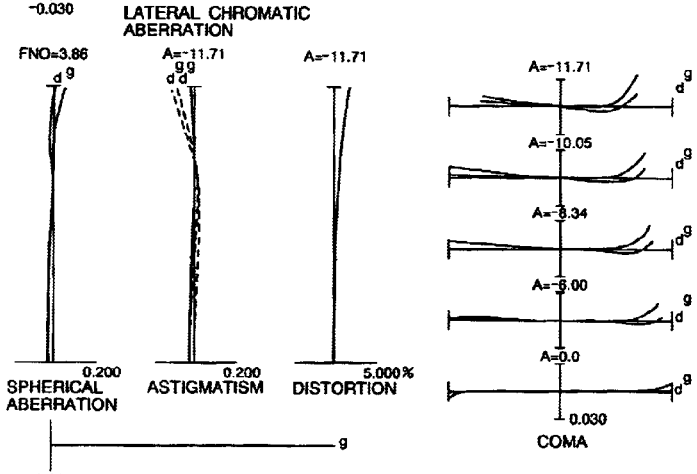
Figure 14C:
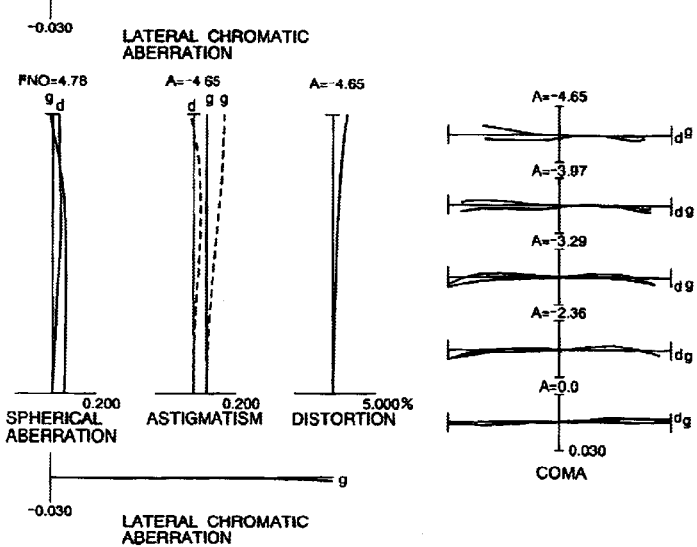

FIGS. 14A to 14C graphically show various aberrations of the zoom lens system according to Example 5 of the first embodiment in the wide-angle end state, an intermediate focal length state, and the telephoto end state, respectively, when focusing at infinity.

Figure 15A:
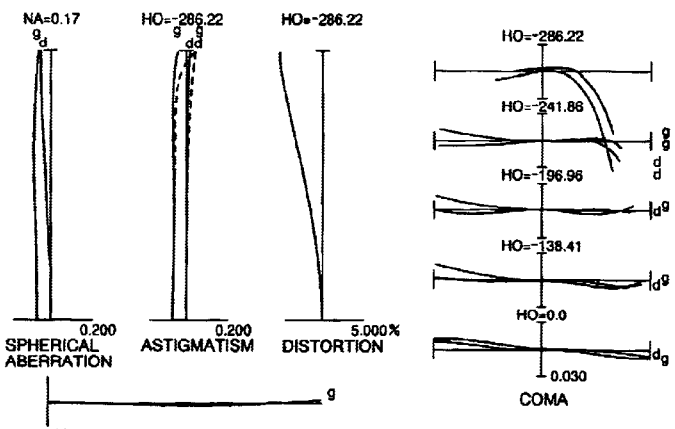
FIGS. 15A to 15C graphically show various aberrations of the zoom lens system according to Example 5 of the first embodiment in the wide-angle end state, the intermediate focal length state, and the telephoto end state, respectively, when the system is focused at a close distance.
Figure 15B:
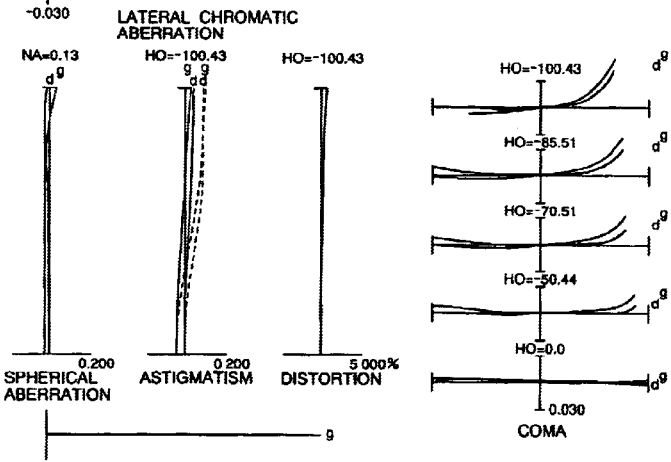
Figure 15C:
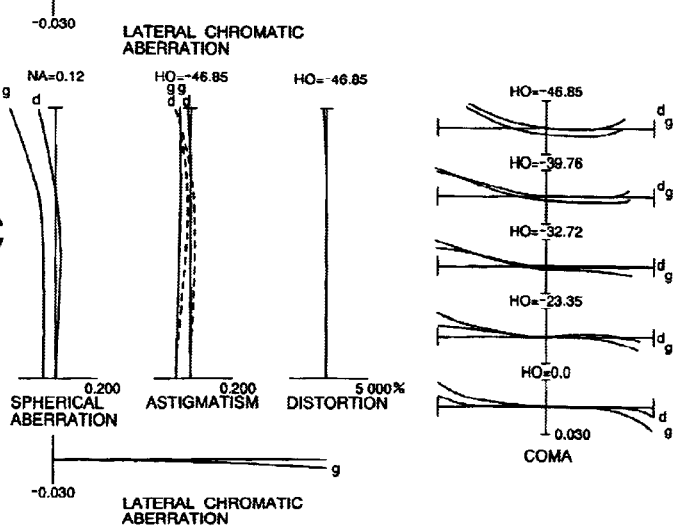

FIGS. 15A to 15C graphically show various aberrations of the zoom lens system according to Example 5 of the first embodiment in the wide-angle end state, an intermediate focal length state, and the telephoto end state, respectively, when focusing at a close object.

As is apparent from the respective graphs showing various aberrations, excellent compensation is made for various aberrations to accomplish high optical performance.

Second Embodiment

Then, a second embodiment of the present invention is going to be explained below. The zoom lens system according to the second embodiment of the present invention, similar to a previously known 4 lens group type of a positive-negative-positive-positive lens power composition, is composed of, in order from an object, a first lens group having positive refractive power, a second lens group having negative refractive power, a third lens group having positive refractive power, and a fourth lens group having positive refractive power. When the state of lens group positions varies from a wide-angle end state (which gives the shortest focal length) to a telephoto end state (which gives the longest focal length), at least the first lens group and the fourth lens group move to the object side such that a separation between the first lens group and the second lens group increases, a separation between the second lens group and the third lens group decreases, and a separation between the third lens group and the fourth lens group decreases.

In a zoom lens system having a high zoom ratio, it is preferable to arrange an aperture stop in the vicinity of the center of the lens system in order to satisfactorily correct variation in off-axis aberrations accompanying with varying the state of lens group positions. Accordingly, in the second embodiment, the aperture stop is arranged in the vicinity of the third lens group and is moved with the third lens group in a body.

In the wide-angle end state, by locating the second lens group away from the aperture stop, the off-axis ray passing through the second lens group passes away from the optical axis. When the state of lens group positions moves from the wide-angle end state to the telephoto end state, by narrowing the separation between the second lens group and the aperture stop, the off-axis ray passing through the second lens group approaches the optical axis. By bringing the first lens group near to the second lens group in the wide-angel end state, the off-axis ray passing through the first lens group is made not to separate from the optical axis as small as possible. When the state of lens group positions moves from the wide-angle end state to the telephoto end state, by widening the separation between the first lens group and the second lens group, the off-axis ray passing through the first lens group is made to separate from the optical axis.

Moreover, the separation between the third lens group and the fourth lens group is made to be wide in the wide-angle end state, and when the state of lens group positions moves to the telephoto end state, the separation between the third lens group and the fourth lens group is made to be narrow, so that the off-axis ray passing through the fourth lens group is made to approach the optical axis.

In this manner, by actively varying the height of the off-axis rays passing through the first, second, third, and fourth lens groups, variation in off-axis aberration accompanying with varying the state of lens group positions is satisfactorily corrected.

In the second embodiment, the zoom lens system is constructed to satisfy the following conditions (I) through (III); (I) the third lens group is composed of three lens elements which are, in order from the object, a first positive lens element, a second positive lens element, and a negative lens element; (II) the fourth lens group has a positive lens element located to the most image side and a negative lens element located to the object side of the positive lens element, and the radius of curvature of the image side of the positive lens element is suitably arranged; and (III) the moving amount of the fourth lens group is suitably arranged when the state of lens group positions varies from the wide-angle end state to the telephoto end state.

Condition (I) is for shortening the total length of the zoom lens system in the telephoto end state. In the second embodiment, it is difficult to shorten the total lens length because the second lens group diverges the light flux converged by the first lens group. Accordingly, the third lens group is constructed by a positive-negative structure in order to move the principal point of the third lens group to the object side, so that the total lens length is shortened. In the second embodiment, by constructing the third lens group such that the condition (I) is satisfied, the thickness of the second positive lens element is suitably set, a portion from the first positive lens element to the object side surface of the second positive lens element works as a positive sub-lens-group, and a portion from the image side surface to the negative lens element works as a negative sub-lens-group, the negative spherical aberration can be-corrected satisfactory even if the refractive power of the third lens group is strong.

Condition (II) defines the position of the exit pupil in the wide-angle end state. By arranging a negative lens element and a positive lens element at the most image side of the fourth lens group, the light flux once diverged by the negative lens element is converged by the positive lens element, so that principal ray come out from the fourth lens group makes a small angle to the optical axis even if the fourth lens group is near to the image plane.

Condition (III) defines the variation in position of the exit pupil upon zooming from the wide-angle end state to the telephoto end state. In other words, it defines the variation in the angle of the principal ray reaching the detector relative to the optical axis upon zooming from the wide-angle end state to the telephoto end state.

In the second embodiment, since the fourth lens group moves to the object side when the state of the lens group positions varies from the wide-angle end state to the telephoto end state, the angle of the principal ray reaching the detector relative to the optical axis becomes small (here, the "becomes small" means that the principal ray reaching the light detector getting away from the optical axis is gradually changing the direction to approach toward the optical axis). When the variation in the angle of the principal ray reaching the light detector relative to the optical axis becomes large, lack of light quantity in the periphery of the image is liable to occur. On the other hand, when the variation is made to be small, in other words, when the moving amount of the fourth lens group is made to be small, in order to keep the predetermined zoom ratio, variation in the off-axis aberration produced upon zooming becomes large.

The zoom lens system according to the second embodiment accomplishes both high zoom ratio and compactness by constructing the system as described above.

Furthermore, according to the second embodiment, the following conditional expressions (11) through (13) are satisfied:

$$0.015 < D3P/FT < 0.100 \quad (11)$$

$$0.10 < YO/(BFW-RE) < 0.25 \; (RE < 0) \quad (12)$$

$$0.4 < \Delta 4/(FT \cdot FW)^{1/2} < 1.0 \quad (13)$$

where D3P denotes the thickness of the second positive lens element in the third lens group, FT denotes the focal length of the zoom lens system in the telephoto end state, YO denotes a half of the diagonal of the image frame, RE denotes a radius of curvature of the most image side surface of the fourth lens group, BFW denotes a distance from the most image side surface of the fourth lens group to the image plane in the wide-angle end state, $\Delta 4$ denotes a moving amount of the fourth lens group (positive upon moving to the object side) when the state of lens group positions varies from the wide-angle end state to the telephoto end state, and FW denotes the focal length of the zoom lens system in the wide-angle end state.

The conditional expressions are going to be explained below.

Conditional expression (11) defines an appropriate range of the thickness of the second positive lens element composing the third lens group.

When the ratio D3P/FT exceeds the upper limit of conditional expression (11), the off-axis ray incident to the fourth lens group largely separates from the optical axis in the wide-angle end state, so that coma produced in the periphery of the image cannot be corrected satisfactorily. On the other hand, when the ratio falls below the lower limit of conditional expression (11), the respective refractive powers of the positive sub-lens-group and the negative sub-lens-group composing the third lens group become large, so that even minute decentering produced while manufacturing process severely degrades the optical performance.

Conditional expression (12) defines an appropriate range of the position of the exit pupil in the wide-angle end state, which defines the condition (II) with specific numerical range.

When the ratio YO/(BFW-RE) exceeds the upper limit of conditional expression (12), the off-axis ray passing through the fourth lens group in the telephoto end state passes away from the optical axis. When the height of the ray passing through the fourth lens group separates from the optical axis, since the image height is fixed, the off-axis ray exit from the fourth lens group is strongly bent to approach the optical axis. As a result, the angle of off-axis ray relative to the optical axis becomes large in the direction approaching the optical axis. Accordingly, the position of the exit pupil relative to the light detector in the telephoto end state becomes near, so that the cutoff of light flux entering into the micro lens array becomes large, and the incident angle of the ray incident to the infrared-ray-cut filter or the low-pass filter becomes large. As a result, difference in color balance and imaging performance becomes apparent between central area and periphery of the image.

Conditional expression (13) defines an appropriate range of the condition (III) with specific numerical values. When the ratio $\Delta 4/(FT \cdot FW)^{1/2}$ exceeds the upper limit of conditional expression (13), lack of the light quantity in the periphery of the image is liable to be occurred in the case that variation in the angle of the principal ray reaching the light detector becomes large. On the other hand, when the ratio falls below the lower limit of conditional expression (13), variation in off-axis aberrations produced upon varying the state of lens group positions becomes large, so that the predetermined optical performance cannot be obtained.

Furthermore, according to the second embodiment, when at least one of the following conditional expressions (14) and (15) is satisfied, higher optical performance can be expected:

$$0.1 \le |F3N|/FT < 0.7 \quad (14)$$

$$0.2 \le |R31|/F3 < 2.0 \quad (15)$$

where F3N denotes the focal length of the negative lens element located in the third lens group, FT denotes the focal length of the zoom lens system in the telephoto end state, R31 denotes a radius of curvature of the image side surface of the negative lens element located in the third lens group, and F3 denotes the focal length of the third lens group.

Conditional expression (14) defines an appropriate range of the focal length of the negative lens element locating in the third lens group. When the ratio |F3N|/FT exceeds the upper limit of conditional expression (14), negative spherical aberration produced in the third lens group in the telephoto end state cannot be satisfactorily corrected. On the other hand, when the ratio falls below the lower limit of conditional expression (14), optical performance in the center of the image is severely degraded by even minute decentering produced upon manufacturing, so that stable optical performance cannot be secured.

Conditional expression (15) defines an appropriate range of the, shape of the negative lens element locating in the third lens group. When the ratio |R31|/F3 exceeds the upper limit of conditional expression (15), negative spherical aberration produced in the third lens group cannot be satisfactorily corrected. On the other hand, when the ratio falls below the lower limit of conditional expression (15), a higher order spherical aberration produced in the third lens group in the telephoto end state becomes large, so that predetermined optical performance cannot be obtained.

Moreover, when conditional expressions (14) and (15) are satisfied at the same time, a higher optical performance can be obtained.

Furthermore, according to the second embodiment, variation in coma in accordance with an angle of view in the wide-angle end state can be satisfactorily corrected by constructing the second lens group with three lens elements which are, in order from the object, a first negative lens element having a concave surface facing to the image, a second negative lens element having a concave surface facing to the object, and a positive lens element having a convex surface facing to the object, and by satisfying the following conditional expression (16);

$$-0.7 < (R21+R22)/(R21-R22) < 0 \quad (16)$$

where R21 denotes a radius of curvature of the image side surface of the first negative lens element located in the second lens group, and R22 denotes a radius of curvature of the object side surface of the second negative lens element located in the second lens group.

Conditional expression (16) defines an appropriate range of the shape of the separation formed between the first negative lens element and the second negative lens element in the second lens group. When the ratio (R21+R22)/(R21−R22) exceeds the upper limit of conditional expression (16), variation in coma in accordance with an angle of view in the wide-angle end state cannot be satisfactorily corrected. On the other hand, when the ratio falls below the lower limit of conditional expression (16), a higher order curvature of field produced in the wide-angle end state cannot be satisfactorily corrected.

Moreover, the second embodiment makes it possible to obtain higher optical performance by introducing an aspherical surface. In particular, by introducing an aspherical surface into the most object side surface of the second lens group, off-axis aberrations produced in the wide-angle end state can be corrected well. By introducing an aspherical surface into the fourth lens group, coma produced in the periphery of the image in the wide-angle end state can be satisfactorily corrected. It is needless to say that when a plurality of aspherical surfaces are introduced in an optical system, a higher optical performance can be obtained.

In the second embodiment, the image can be shifted by moving a lens group or a portion of a lens group composing the optical system in the direction substantially perpendicular to the optical axis. Accordingly, the optical system can be worked as a vibration reduction optical system by combining the optical system with a detector for detecting a camera shake, a driver for driving the above-mentioned shift lens group, and a controller for giving a shift amount to the driver according to an output of the detector.

In the second embodiment, the second lens group is preferably moved along the optical axis in order to suppress variation in various aberrations upon focusing at a close object.

Moreover, as shown in examples below, focusing may be carried out by moving a fifth lens group which is arranged to the image side of the fourth lens group and is fixed upon zooming.

It is also possible for the second embodiment to arrange a low-pass filter for preventing moiré patterns to be produced or an infrared-cut filter in accordance with the frequency characteristic of the light detector.

It is also needless to say that the second embodiment can be applied not only to a zoom lens system but also to a variable focal length zoom lens system whose focal length does not exist continuously.

Figure 16:
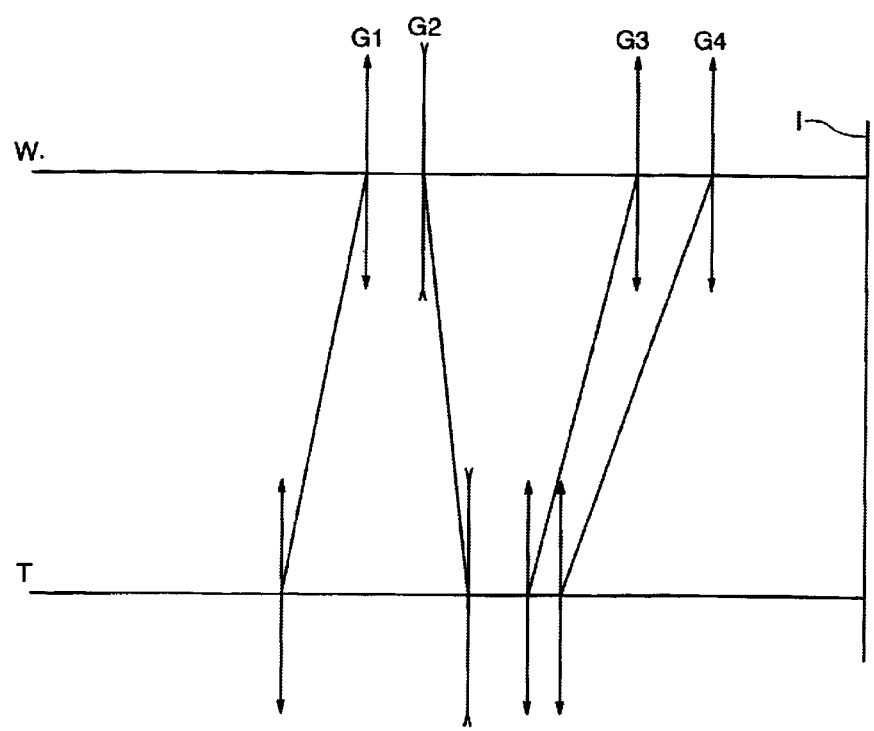
FIG. 16 is a diagram showing a distribution of refractive power in a zoom lens system according to Examples 6 through 8 of a second embodiment of the present invention, together with the movement of each lens group upon zooming.

FIG. 16 is a diagram showing a distribution of refractive power in a zoom lens system according to Examples 6 through 8 of a second embodiment of the present invention, together with the movement of each lens-group upon zooming. The zoom lens system is composed of, in order from an object, a first lens group G1 having positive refractive power, a second lens group G2 having negative refractive power, a third lens group G3 having positive refractive power, and a fourth lens group G4 having positive refractive power. When the state of lens group positions varies from a wide-angle end state W to a telephoto end state T, at least the first lens group G1 and the fourth lens group G4 moves to the object side such that a separation between the first lens group G1 and the second lens group G2 increases, a separation between the second lens group G2 and the third lens group G3 decreases, and a separation between the third lens group G3 and the fourth lens group G4 decreases.

Examples according to the second embodiment are going to be explained below.

EXAMPLE 6

Figure 17:
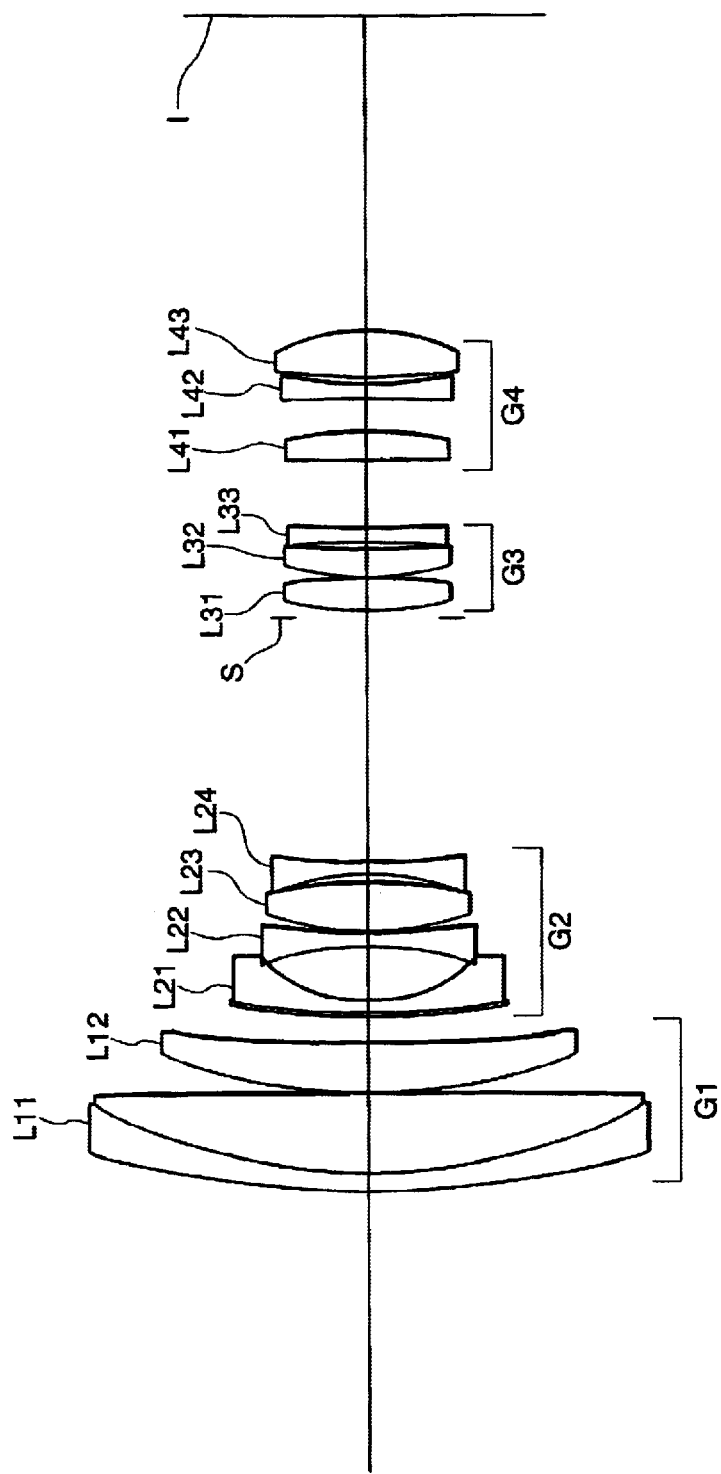
FIG. 17 is a diagram showing the lens arrangement of a zoom lens system according to Example 6 of the second embodiment of the present invention.

FIG. 17 is a diagram showing the lens arrangement of a zoom lens system according to Example 6 of the second embodiment of the present invention. The first lens group G1 is composed of, in order from the object, a cemented positive lens L11 constructed by a negative meniscus lens having a convex surface facing to the object cemented with a double convex positive lens, and a positive meniscus lens L12 having a convex surface facing to the object. The second lens group G2 is composed of, in order from the object, a negative meniscus lens L21 having a concave surface facing to an image, a double concave negative lens L22, a double convex positive lens L23, and a double concave negative lens L24. The third lens group G3 is composed of, in order from the object, a double convex positive lens L31, a positive meniscus lens L32 having a convex surface facing to the object, and a double concave negative lens L33. The fourth lens group G4 is composed of, in order from the object, a double convex positive lens L41, a double concave negative lens L42, and a double convex positive lens L43.

In Example 6, an aperture stop S is arranged to the object side of the third lens group G3 and moved together with the third lens group G3 upon varying the state of lens group positions. The object side surface of the negative meniscus lens L21 has a thin plastic layer having an aspherical shape.

Various values associated with Example 6 are listed in Table 6.

TABLE 6

| (Specifications) | | | |
|---|---|---|---|
| | W | M | T |
| F: | 9.24 | 27.85 | 69.08 |
| FNO | 2.88 | 4.07 | 4.57 |
| 2A: | 65.68° | 22.73° | 9.24° |

| (Lens Data) | | | | |
|---|---|---|---|---|
| surface number | r | d | ν | n |
| 1 | 58.1774 | 1.100 | 23.78 | 1.84666 |
| 2 | 32.3102 | 4.850 | 53.22 | 1.69350 |
| 3 | −1100.3070 | 0.100 | | |
| 4 | 31.3882 | 3.000 | 81.61 | 1.49700 |
| 5 | 101.4717 | (D5) | | |
| 6 | 49.8292 | 0.150 | 37.63 | 1.55281 |
| 7 | 40.9329 | 0.800 | 42.72 | 1.83481 |
| 8 | 8.7597 | 3.300 | | |
| 9 | −17.9739 | 0.800 | 52.32 | 1.75500 |
| 10 | 38.2993 | 0.100 | | |
| 11 | 16.0444 | 3.000 | 23.78 | 1.84666 |
| 12 | −23.2486 | 0.500 | | |

TABLE 6-continued

| | | | | |
|---|---|---|---|---|
| 13 | −13.2328 | 0.800 | 52.32 | 1.75500 |
| 14 | 49.6952 | (D14) | | |
| 15 | 0.0000 | 0.500 | Aperture Stop S | |
| 16 | 18.1909 | 1.900 | 65.47 | 1.60300 |
| 17 | −51.1289 | 0.100 | | |
| 18 | 14.6261 | 1.750 | 81.61 | 1.49700 |
| 19 | 68.3896 | 0.450 | | |
| 20 | −36.0893 | 0.800 | 26.52 | 1.76182 |
| 21 | 69.3010 | (D21) | | |
| 22 | 106.1688 | 1.750 | 61.18 | 1.58913 |
| 23 | −21.4784 | 2.000 | | |
| 24 | −106.2550 | 0.800 | 37.17 | 1.83400 |
| 25 | 23.9421 | 0.500 | | |
| 26 | 51.6969 | 2.750 | 70.24 | 1.48749 |
| 27 | −11.8754 | (BF) | | |

(Aspherical Surface Data)
Surface Number = 6

| | |
|---|---|
| κ | = 11.0000 |
| C4 | = +4.7617E−6 |
| C6 | = −4.6171E−7 |
| C8 | = +1.1942E−8 |
| C10 | = −5.6946E−11 |

Surface Number = 22

| | |
|---|---|
| κ | = 10.9633 |
| C4 | = 2.1372E−4 |
| C6 | = +9.9701E−8 |
| C8 | = +3.6294E−9 |
| C10 | = −5.3913E−11 |

(Variable Intervals upon Zooming)

| | W | M | T |
|---|---|---|---|
| F | 9.2400 | 27.8466 | 69.0818 |
| D5 | 1.6640 | 12.6396 | 23.3546 |
| D14 | 14.9508 | 5.2294 | 1.2000 |
| D21 | 4.1931 | 1.1370 | 0.5000 |
| BF | 19.0092 | 31.8223 | 36.5596 |

(Values for the conditional expressions)

| | |
|---|---|
| YO | = 5.7 |
| F3N | = −31.049 |
| F3 | = +22.648 |
| (11) | D3P/FT = 0.025 |
| (12) | YO/(BFW − RE) = 0.185 |
| (13) | Δ4/(FT · FW)$^{1/2}$ = 0.695 |
| (14) | \| F3N \| /FT = 0.449 |
| (15) | \| R31 \| /F3 = 1.593 |
| (16) | (R21 + R22)/(R21 − R22) = −0.361 |

Figure 18A:
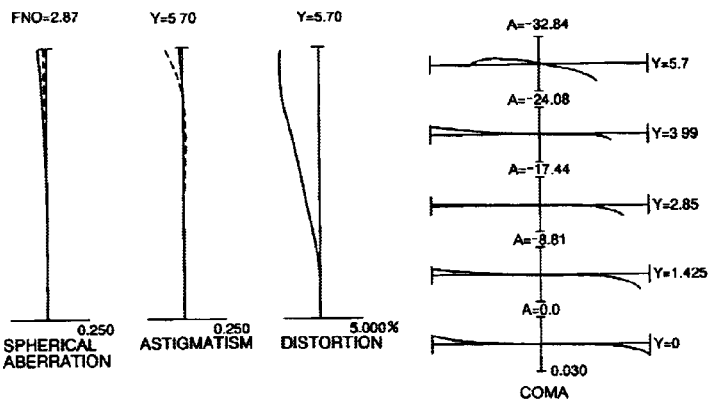
FIGS. 18A to 18C graphically show various aberrations of the zoom lens system according to Example 6 of the second embodiment in a wide-angle end state, an intermediate focal length state, and a telephoto end state, respectively.
Figure 18B:
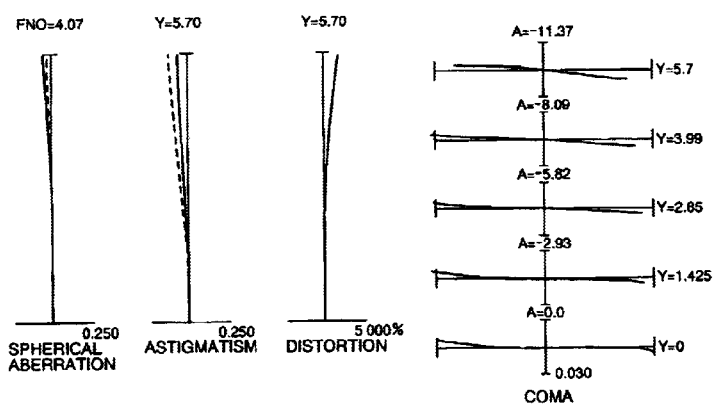
Figure 18C:
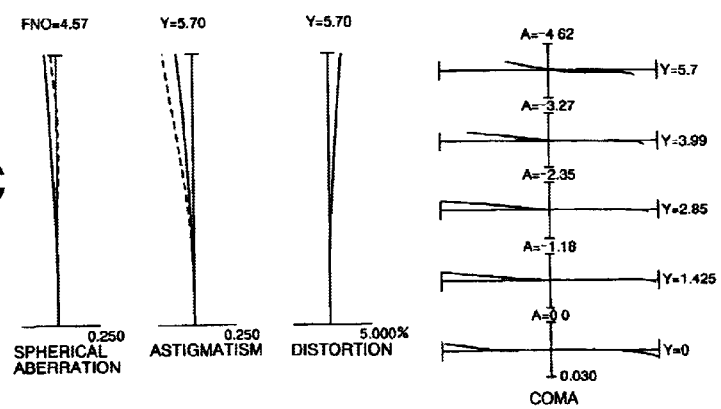

FIGS. 18A to 18C graphically show various aberrations of the zoom lens system according to Example 6 of the second embodiment in a wide-angle end state (F=9.24), an intermediate focal length state (F=27.85), and a telephoto end state (F=69.08), respectively.

In aberration graphs of FIGS. 18A through 18C, in the graphs showing spherical aberration, a solid line indicates spherical aberration, and a broken line indicates sine condition. In the graphs showing astigmatism, a solid line indicates a sagittal image plane, and a broken line indicates a meridional image plane. FNO denotes the f-number, and the maximum value of it in the graphs showing spherical aberration. Y denotes the image height, and, in particular, the maximum value of it in the graphs showing astigmatism and distortion. In the graphs showing coma, the values of coma at image height Y=0, 1.425, 2.85, 3.99, and 5.70 are shown, respectively. A denotes a half angle of view.

By the way, the above explanation is applied to all Examples of the second embodiment.

As is apparent from the respective graphs showing various aberrations according to Example 6, excellent compensation is made for various aberrations to accomplish high optical performance.

EXAMPLE 7

Figure 19:
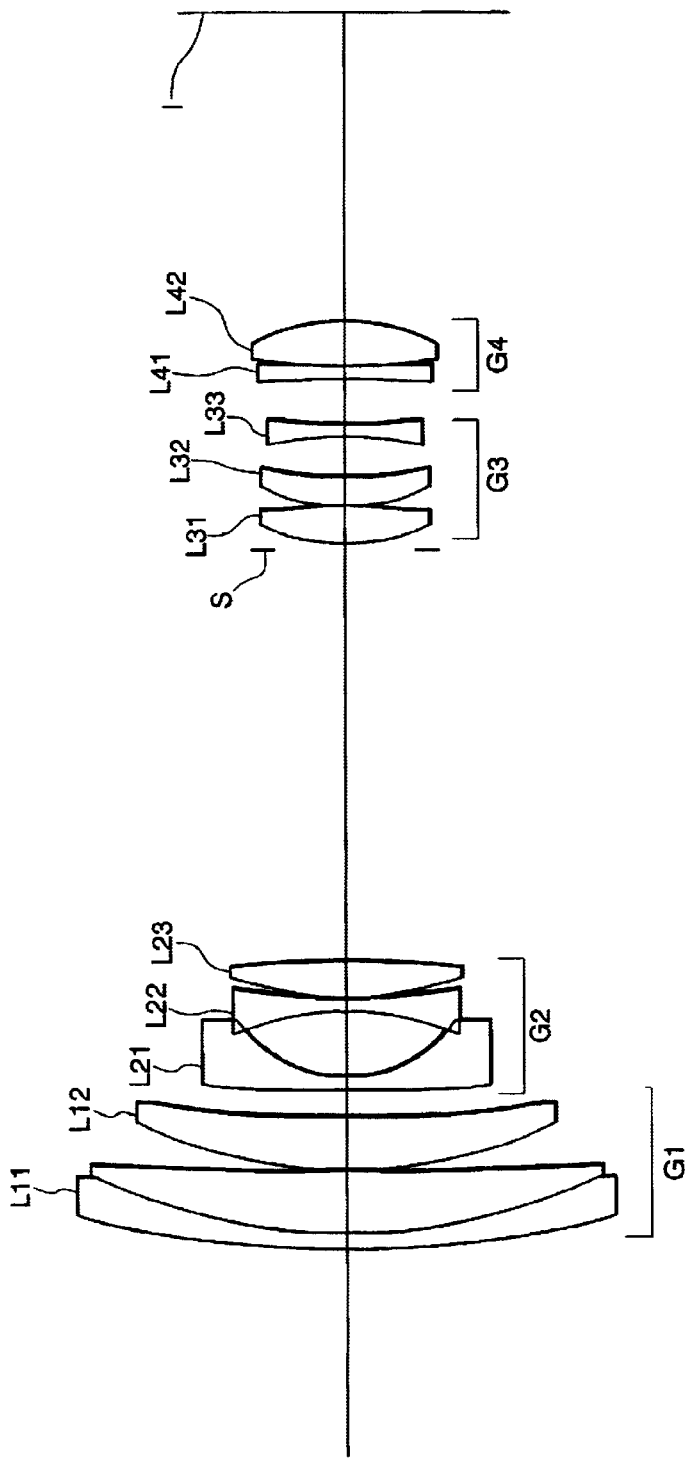
FIG. 19 is a diagram showing the lens arrangement of a zoom lens system according to Example 7 of the second embodiment of the present invention.

FIG. 19 is a diagram showing the lens arrangement of a zoom lens system according to Example 7 of the second embodiment of the present invention. The first lens group G1 is composed of, in order from the object, a cemented positive lens L11 constructed by a negative meniscus lens having a convex surface facing to the object cemented with a positive meniscus lens having a convex surface facing to the object, and a positive meniscus lens L12 having a convex surface facing to the object. The second lens group G2 is composed of, in order from the object, a negative meniscus lens L21 having a concave surface facing to the image, a double concave negative lens L22, and a double convex positive lens L23. The third lens group G3 is composed of, in order from the object, a double convex positive lens L31, a positive meniscus lens L32 having a convex surface facing to the object, and a double concave negative lens L33. The fourth lens group G4 is composed of, in order from the object, a double concave negative lens L41, and a double convex positive lens L42.

In Example 7, an aperture stop S is arranged to the object side of the third lens group G3 and moved together with the third lens group G3 upon varying the state of lens group positions.

Various values associated with Example 7 are listed in Table 7.

TABLE 7

(Specifications)

| | W | M | T |
|---|---|---|---|
| F: | 9.25 | 27.00 | 69.00 |
| FNO | 2.94 | 3.69 | 4.19 |
| 2A: | 68.31° | 24.74° | 9.81° |

(Lens Data)

| surface number | r | d | ν | n |
|---|---|---|---|---|
| 1 | 68.1699 | 1.100 | 23.78 | 1.84666 |
| 2 | 36.9502 | 4.150 | 52.32 | 1.75500 |
| 3 | 424.3846 | 0.100 | | |
| 4 | 30.0615 | 3.450 | 81.61 | 1.49700 |
| 5 | 94.3228 | (D5) | | |
| 6 | 120.6095 | 0.950 | 49.61 | 1.77250 |
| 7 | 8.7031 | 4.300 | | |
| 8 | −17.7030 | 0.800 | 52.32 | 1.75500 |
| 9 | 39.6834 | 0.100 | | |
| 10 | 22.8115 | 2.450 | 23.78 | 1.84666 |
| 11 | −69.6974 | (D11) | | |
| 12 | 0.0000 | 0.500 | Aperture Stop S | |
| 13 | 13.6547 | 2.450 | 81.61 | 1.49700 |
| 14 | −44.0432 | 0.100 | | |
| 15 | 12.9956 | 1.900 | 70.24 | 1.48749 |
| 16 | 26.1959 | 2.750 | | |
| 17 | −21.9046 | 0.800 | 37.17 | 1.83400 |
| 18 | 50.0000 | (D18) | | |
| 19 | 74.6330 | 0.800 | 25.43 | 1.80518 |
| 20 | 66.0712 | 0.100 | | |
| 21 | 27.8830 | 2.950 | 60.69 | 1.56384 |
| 22 | −12.4848 | (BF) | | |

TABLE 7-continued (Aspherical Surface Data)
Surface Number = 6

| κ | = 11.0000 |
|---|---|
| C4 | = +2.0576E−6 |
| C6 | = −2.6745E−7 |
| C8 | = +2.1726E−9 |
| 010 | = −9.7494E−12 |

Surface Number = 21

| κ | = 3.5003 |
|---|---|
| C4 | = −2.5030E−4 |
| C6 | = +1.1452E−7 |
| C8 | = +1.5883E−8 |
| C10 | = −4.1833E−10 |

(Variable Intervals upon Zooming)

| | W | M | T |
|---|---|---|---|
| F | 9.2500 | 26.9999 | 68.9997 |
| D5 | 1.8289 | 14.2396 | 24.8464 |
| D11 | 27.6563 | 10.3330 | 1.3000 |
| D18 | 3.0203 | 1.3078 | 0.8819 |
| BF | 20.3805 | 29.6301 | 35.2213 |

(Values for the conditional expressions)

| YO | = 6.0 |
|---|---|
| F3N | = −18.172 |
| F3 | = +31.748 |
| (11) | D3P/FT = 0.028 |
| (12) | YO/(BEW − RE) = 0.183 |
| (13) | Δ4/(FT · FW)$^{1/2}$ = 0.587 |
| (14) | ∣F3N∣/FT = 0.263 |
| (15) | ∣R31∣/F3 = 0.690 |
| (16) | (R21 + R22)/(R21 − R22) = −0.383 |

Figure 20A:
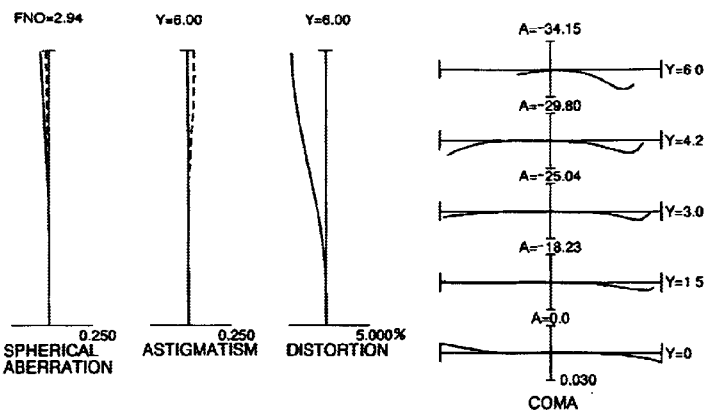
FIGS. 20A to 20C graphically show various aberrations of the zoom lens system according to Example 7 of the second embodiment in the wide-angle end state, the intermediate focal length state, and the telephoto end state, respectively.
Figure 20B:
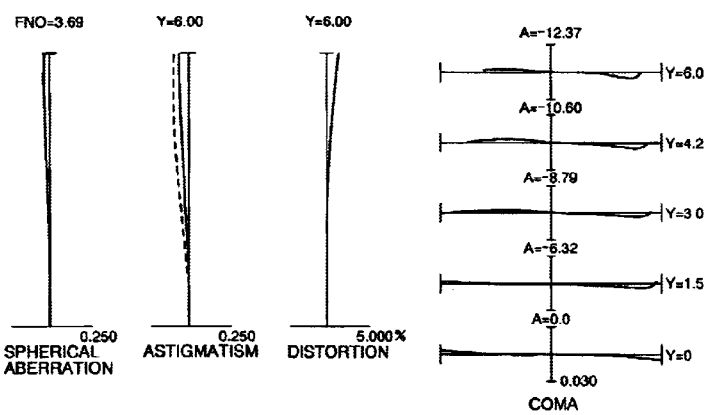
Figure 20C:
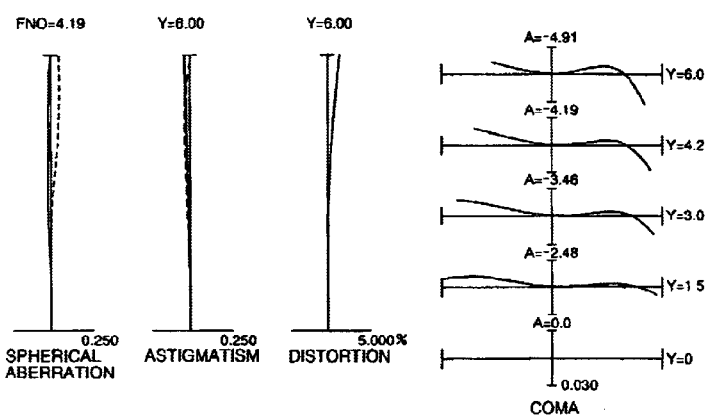

FIGS. 20A to 20C graphically show various aberrations of the zoom lens system according to Example 7 of the second embodiment in a wide-angle end state (F=9.25), an intermediate focal length state (F=27.00), and a telephoto end state (F=69.00), respectively. In the graphs showing coma, the values of coma at image height Y=0, 1.5, 3.0, 4.2, and 6.0 are shown, respectively. A denotes a half angle of view.

As is apparent from the respective graphs showing various aberrations according to Example 7, excellent compensation is made for various aberrations to accomplish high optical performance.

EXAMPLE 8

Figure 21:
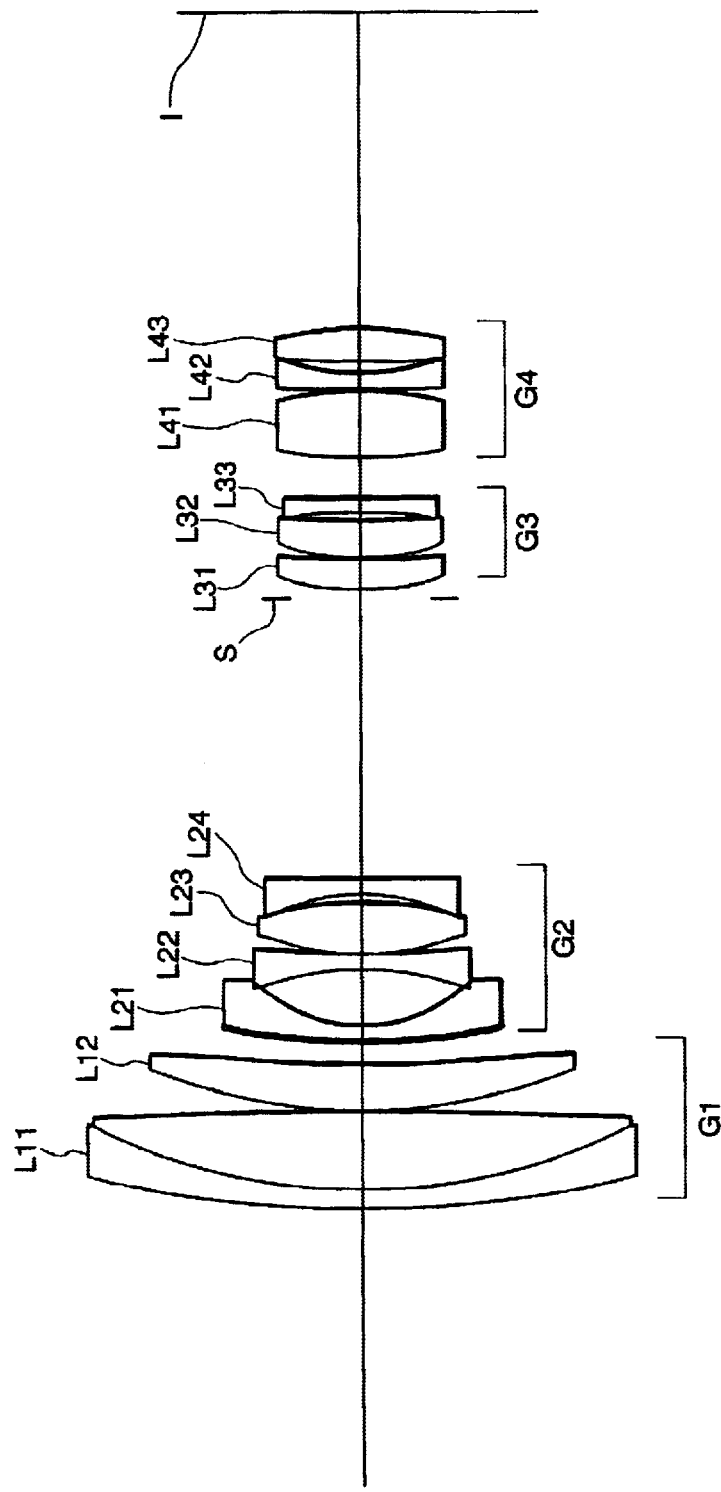
FIG. 21 is a diagram showing the lens arrangement of a zoom lens system according to Example 8 of the second embodiment of the present invention.

FIG. 21 is a diagram showing the lens arrangement of a zoom lens system according to Example 8 of the second embodiment of the present invention. The first lens group G1 is composed of, in order from the object, a cemented positive lens L11 constructed by a negative meniscus lens having a convex surface facing to the object cemented with a double convex positive lens, and a positive meniscus lens L12 having a convex surface facing to the object. The second lens group G2 is composed of, in order from the object, a negative meniscus lens L21 having a concave surface facing to an image, a double concave negative lens L22, a double convex positive lens L23, and a double concave negative lens L24. The third lens group G3 is composed of, in order from the object, a positive meniscus lens L31 having a convex surface facing to the object, a positive meniscus lens L32 having a convex surface facing to the object, and a double concave negative lens L33. The fourth lens group G4 is composed of, in order from the object, a double convex positive lens L41, a negative meniscus lens L42 having a concave surface facing to the image, and a double convex positive lens L43.

In Example 8, an aperture stop S is arranged to the object side of the third lens group G3 and moved together with the third lens group G3 upon varying the state of lens group positions. The object side surface of the negative meniscus lens L21 has a thin plastic layer having an aspherical shape.

Various values associated with Example 8 are listed in Table 8.

TABLE 8

(Specifications)

| | W | M | T |
|---|---|---|---|
| F: | 9.24 | 27.00 | 69.10 |
| FNO | 2.88 | 4.22 | 4.82 |
| 2A: | 65.66° | 23.42° | 9.24° |

(Lens Data)

| surface number | r | d | ν | n |
|---|---|---|---|---|
| 1 | 63.7829 | 1.100 | 23.78 | 1.84666 |
| 2 | 34.0803 | 4.750 | 53.22 | 1.69350 |
| 3 | −512.6777 | 0.100 | | |
| 4 | 32.1059 | 2.800 | 81.61 | 1.49700 |
| 5 | 100.1162 | (D5) | | |
| 6 | 46.3193 | 0.150 | 37.63 | 1.55281 |
| 7 | 38.4937 | 0.800 | 42.72 | 1.83481 |
| 8 | 9.1197 | 3.550 | | |
| 9 | −18.6308 | 0.800 | 52.32 | 1.75500 |
| 10 | 48.8492 | 0.100 | | |
| 11 | 17.9683 | 3.100 | 23.78 | 1.84666 |
| 12 | −24.1829 | 0.550 | | |
| 13 | −13.8003 | 0.800 | 52.32 | 1.75500 |
| 14 | 69.2346 | (D14) | | |
| 15 | 0.0000 | 0.500 | Aperture Stop S | |
| 16 | 14.1059 | 1.850 | 65.47 | 1.60300 |
| 17 | 69.0669 | 0.100 | | |
| 18 | 14.7657 | 2.250 | 81.61 | 1.49700 |
| 19 | 71.8801 | 0.500 | | |
| 20 | −38.0948 | 0.800 | 26.52 | 1.76182 |
| 21 | 93.0255 | (D21) | | |
| 22 | 21.6243 | 4.000 | 61.18 | 1.58913 |
| 23 | 20.8780 | 0.100 | | |
| 24 | 97.7551 | 1.000 | 37.17 | 1.83400 |
| 25 | 15.0158 | 0.700 | | |
| 26 | 55.4023 | 2.000 | 70.24 | 1.48749 |
| 27 | −20.3229 | (BF) | | |

(Aspherical Surface Data)
Surface Number = 6

| κ | = 11.0000 |
|---|---|
| C4 | = +5.8871E−6 |
| C6 | = −1.3199E−7 |
| C8 | = +5.2518E−10 |
| C10 | = +2.4739E−11 |

Surface Number = 22

| κ | = −6.8530 |
|---|---|
| C4 | = −1.3604E−4 |
| C6 | = −5.1095E−7 |
| C8 | = +1.7308E−9 |
| C10 | = +1.0415E−10 |

(Variable Intervals upon Zooming)

| | W | M | T |
|---|---|---|---|
| F | 9.2394 | 26.9953 | 69.0998 |
| D5 | 1.4000 | 11.6216 | 23.5678 |
| D14 | 17.4652 | 6.6875 | 2.0000 |
| D21 | 2.5670 | 0.9209 | 0.5000 |
| BF | 19.0095 | 31.4212 | 36.6600 |

TABLE 8-continued (Values for the conditional expressions)

| | |
|---|---|
| YO | = 5.7 |
| F3N | = −35.384 |
| F3 | = +26.597 |
| (11) | D3P/FT = 0.058 |
| (12) | YO/(BFW − RE) = 0.145 |
| (13) | Δ4/(FT · FW)$^{1/2}$ = 0.699 |
| (14) | \| F3N \| /FT = 0.512 |
| (15) | \| R31 \| /F3 = 1.432 |
| (16) | (R21 + R22)/(R21 − R22) = −0.448 |

Figure 22A:
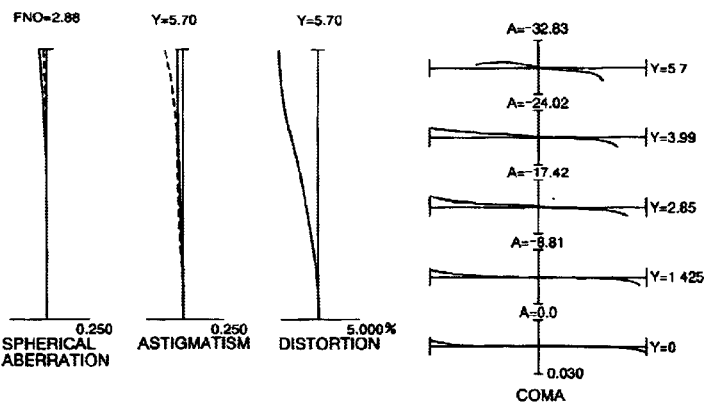
FIGS. 22A to 22C graphically show various aberrations of the zoom lens system according to Example 8 of the second embodiment in the wide-angle end state, the intermediate focal length state, and the telephoto end state, respectively.
Figure 22B:
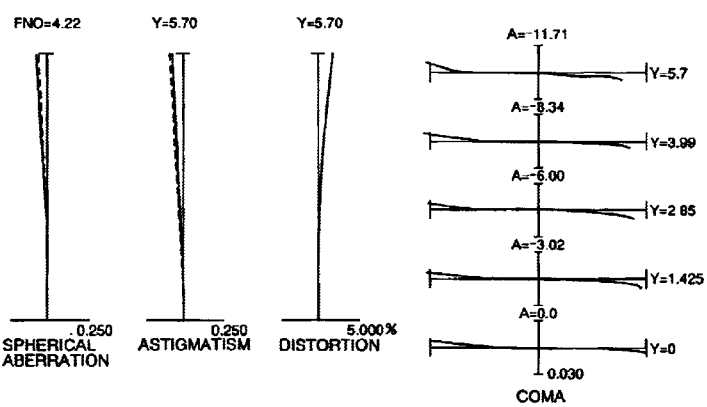
Figure 22C:
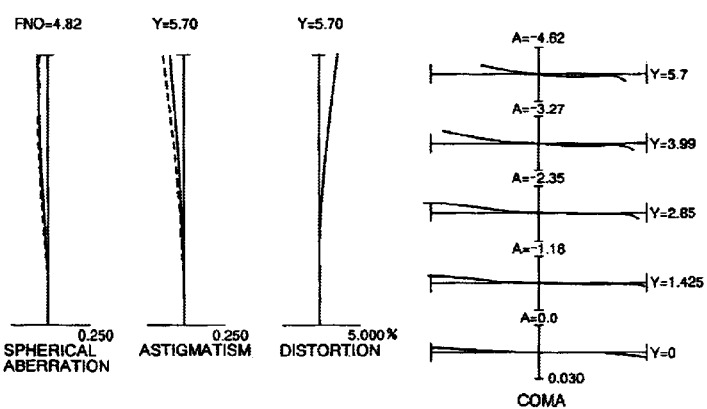

FIGS. 22A to 22C graphically show various aberrations of the zoom lens system according to Example 8 of the second embodiment in a wide-angle end state (F=9.24), an intermediate focal length state (F=27.00), and a telephoto end state (F=69.10), respectively. In the graphs showing coma, the values of coma at image height Y=0, 1.425, 2.85, 3.99, and 5.70 are shown, respectively. A denotes a half angle of view.

As is apparent from the respective graphs showing various aberrations according to Example 8, excellent compensation is made for various aberrations to accomplish high optical performance.

EXAMPLE 9

Figure 23:
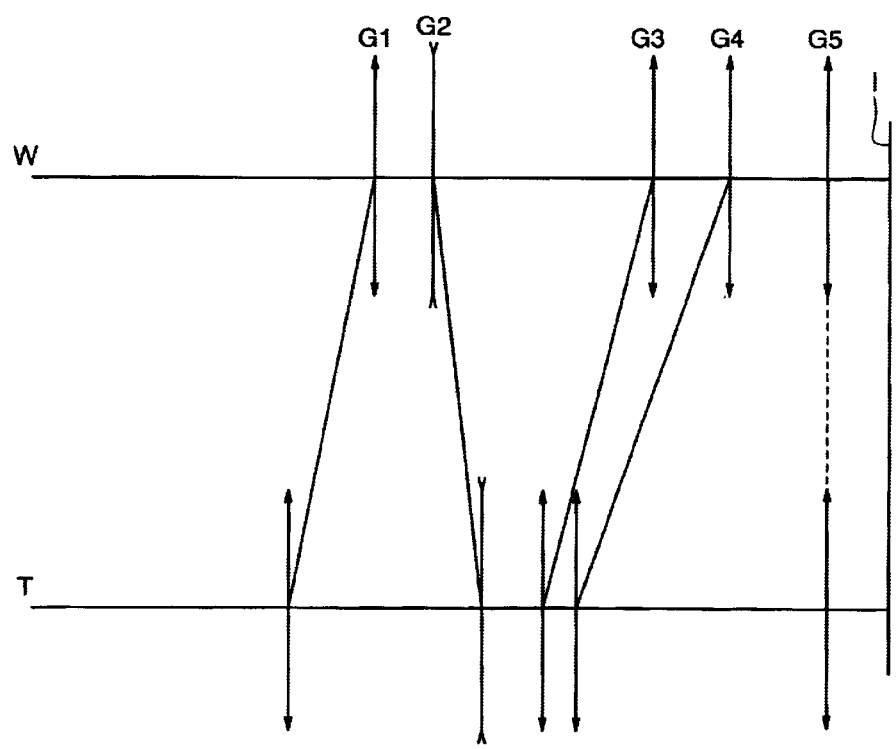
FIG. 23 is a diagram showing a distribution of refractive power in a zoom lens system according to Examples 9 and 10 of the second embodiment of the present invention, together with the movement of each lens group upon zooming.

FIG. 23 is a diagram showing a distribution of refractive power in a zoom lens system according to Examples 9 and 10 of the second embodiment of the present invention, together with the movement of each lens group upon zooming. The zoom lens system is composed of, in order from the object, a first lens group G1 having positive refractive power, a second lens group G2 having negative refractive power, a third lens group G3 having positive refractive power, a fourth lens group G4 having positive refractive power, and a fifth lens group G5 having positive refractive power. When the state of lens group positions varies from a wide-angle end state W to a telephoto end state T, at least the first lens group G1 and the fourth lens group G4 moves to the object side such that a separation between the first lens group G1 and the second lens group G2 increases, a separation between the second lens group G2 and the third lens group G3 decreases, a separation between the third lens group G3 and the fourth lens group G4 decreases, and a separation between the fourth lens group G4 and the fifth lens group G5 increases, and the fifth lens group G5 is fixed along the optical axis upon zooming.

Figure 24:
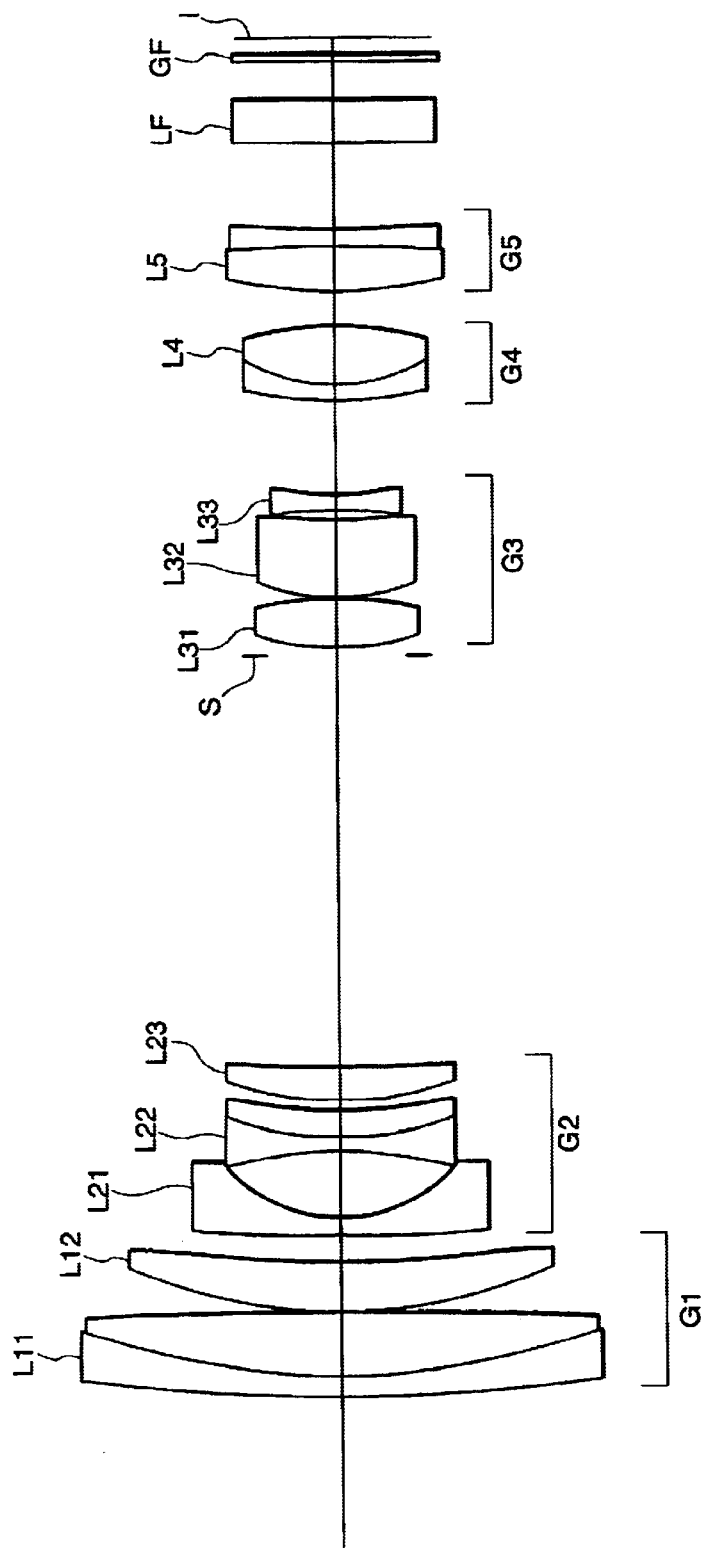
FIG. 24 is a diagram showing the lens arrangement of a zoom lens system according to Example 9 of the second embodiment of the present invention.

FIG. 24 is a diagram showing the lens arrangement of a zoom lens system according to Example 9 of the second embodiment of the present invention. The first lens group G1 is composed of, in order from the object, a cemented positive lens L11 constructed by a negative meniscus lens having a convex surface facing to the object cemented with a double convex positive lens, and a positive meniscus lens L12 having a convex surface facing to the object. The second lens group G2 is composed of, in order from the object, a negative meniscus lens L21 having a concave surface facing to an image, a cemented negative lens L22 constructed by a double concave negative lens cemented with a positive meniscus lens having a convex surface facing to the object, and a positive meniscus lens L23 having a convex surface facing to the object. The third lens group G3 is composed of, in order from the object, a double convex positive lens L31, a positive meniscus lens L32 having a convex surface facing to the object, and a double concave negative lens L33. The fourth lens group G4 is composed of, in order from the object, a cemented positive lens L4 constructed by a negative meniscus lens having a concave surface facing to the image cemented with a double convex positive lens. The fifth lens group G5 is composed of, in order from the object, a cemented positive lens L5 constructed by a double convex positive lens cemented with a double concave negative lens.

In Example 9, an aperture stop S is arranged to the object side of the third lens group G3 and moved together with the third lens group G3 upon varying the state of lens group positions.

A low-pass filter LF and a protection glass GF are arranged to the image side of the fifth lens group G5.

Various values associated with Example 9 are listed in Table 9.

TABLE 9

(Specifications)

| | W | N | T |
|---|---|---|---|
| F: | 9.17 | 26.98 | 69.07 |
| FNO | 2.90 | 3.88 | 4.45 |
| 2A: | 66.22° | 23.66° | 9.76° |

(Lens Data)

| surface number | r | d | ν | n |
|---|---|---|---|---|
| 1 | 112.4351 | 1.300 | 23.78 | 1.84666 |
| 2 | 46.6040 | 4.100 | 47.38 | 1.78800 |
| 3 | −1133.2893 | 0.100 | | |
| 4 | 33.8557 | 3.150 | 82.52 | 1.49782 |
| 5 | 95.7487 | (D5) | | |
| 6 | 108.3076 | 1.200 | 46.58 | 1.80400 |
| 7 | 10.0068 | 4.300 | | |
| 8 | −29.0221 | 0.900 | 54.66 | 1.72916 |
| 9 | 21.5697 | 1.700 | 23.78 | 1.84666 |
| 10 | 36.0418 | 0.700 | | |
| 11 | 22.2130 | 2.100 | 23.78 | 1.84666 |
| 12 | 133.9390 | (D12) | | |
| 13 | 0.0000 | 0.500 | Aperture Stop S | |
| 14 | 19.0286 | 3.050 | 82.52 | 1.49782 |
| 15 | −26.3022 | 0.200 | | |
| 16 | 14.4696 | 4.900 | 47.82 | 1.75700 |
| 17 | 43.2842 | 0.750 | | |
| 18 | −27.1397 | 0.900 | 31.07 | 1.68893 |
| 19 | 15.2385 | (D19) | | |
| 20 | 28.7363 | 0.900 | 42.72 | 1.83481 |
| 21 | 10.1303 | 3.850 | 58.96 | 1.51823 |
| 22 | −21.2189 | (D22) | | |
| 23 | 27.6733 | 3.000 | 46.58 | 1.80400 |
| 24 | −78.3460 | 1.000 | 23.78 | 1.84666 |
| 25 | 103.6796 | 5.564 | | |
| 26 | 0.0000 | 2.760 | 64.14 | 1.51633 |
| 27 | 0.0000 | 2.470 | | |
| 28 | 0.0000 | 0.500 | 64.14 | 1.51633 |
| 29 | 0.0000 | (BF) | | |

(Variable Intervals upon Zooming)

| | W | M | T |
|---|---|---|---|
| F | 9.1663 | 26.9807 | 69.0681 |
| D5 | 1.6978 | 17.4661 | 30.9448 |
| D12 | 27.1095 | 11.2260 | 2.5720 |
| D19 | 6.2411 | 1.3151 | 1.4085 |
| D22 | 2.3722 | 17.3760 | 24.4561 |
| BF | 1.0326 | 1.0326 | 1.0326 |

(Values for the conditional expressions)

| | |
|---|---|
| YO | = 5.7 |
| F3N | = −14.044 |
| F3 | = +25.445 |
| (11) | D3P/FT = 0.071 |

TABLE 9-continued

| | |
|---|---|
| (12) | YO/(BFW − RE) = 0.143 |
| (13) | Δ4/(FT · FW)$^{1/2}$ = 0.878 |
| (14) | \| F3N \| /FT = 0.203 |
| (15) | \| R31 \| /F3 = 1.067 |
| (16) | (R21 + R22)/(R21 − R22) = −0.108 |

Figure 25A:
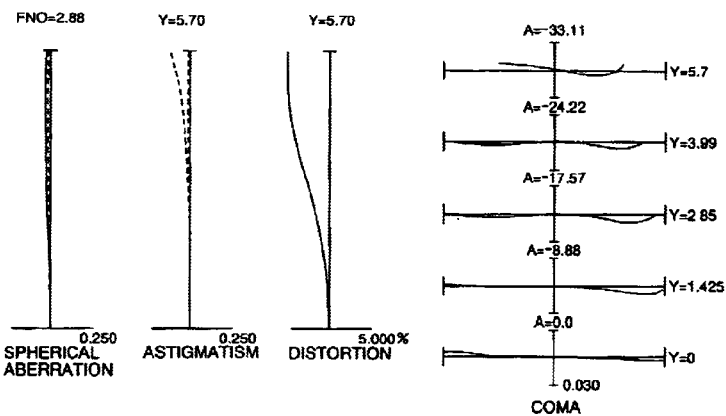
FIGS. 25A to 25C graphically show various aberrations of the zoom lens system according to Example 9 of the second embodiment in the wide-angle end state, the intermediate focal length state, and the telephoto end state, respectively.
Figure 25B:
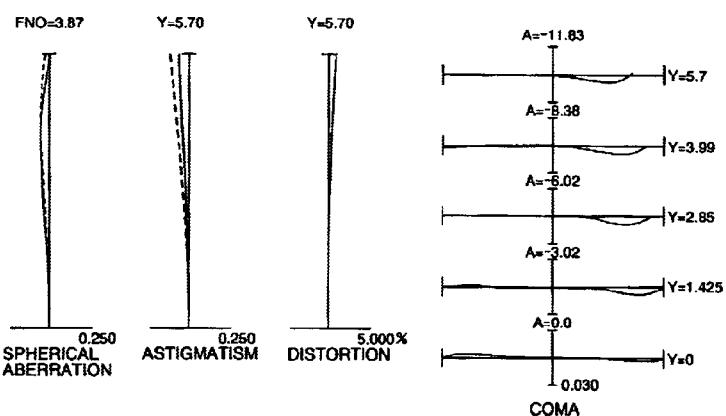
Figure 25C:
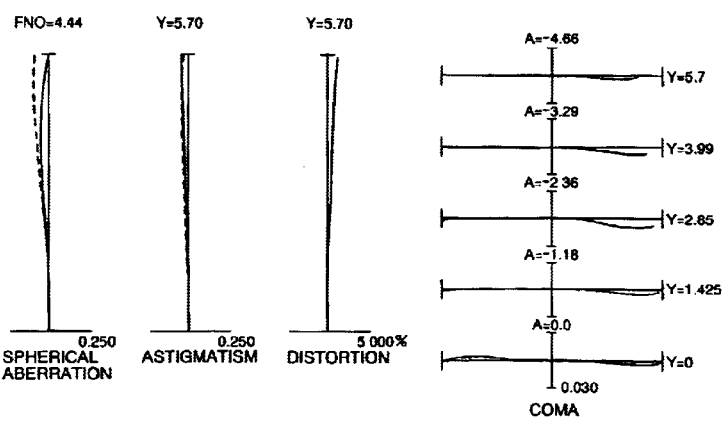

FIGS. 25A to 25C graphically show various aberrations of the zoom lens system according to Example 9 of the second embodiment in a wide-angle end state (F=9.17), an intermediate focal length state (F=26.98), and a telephoto end state (F=69.07), respectively. In the graphs showing coma, the values of coma at image height Y=0, 1.425, 2.85, 3.99, and 5.70 are shown, respectively. A denotes a half angle of view.

As is apparent from the respective graphs showing various aberrations according to Example 9, excellent compensation is made for various aberrations to accomplish high optical performance.

EXAMPLE 10

Figure 26:
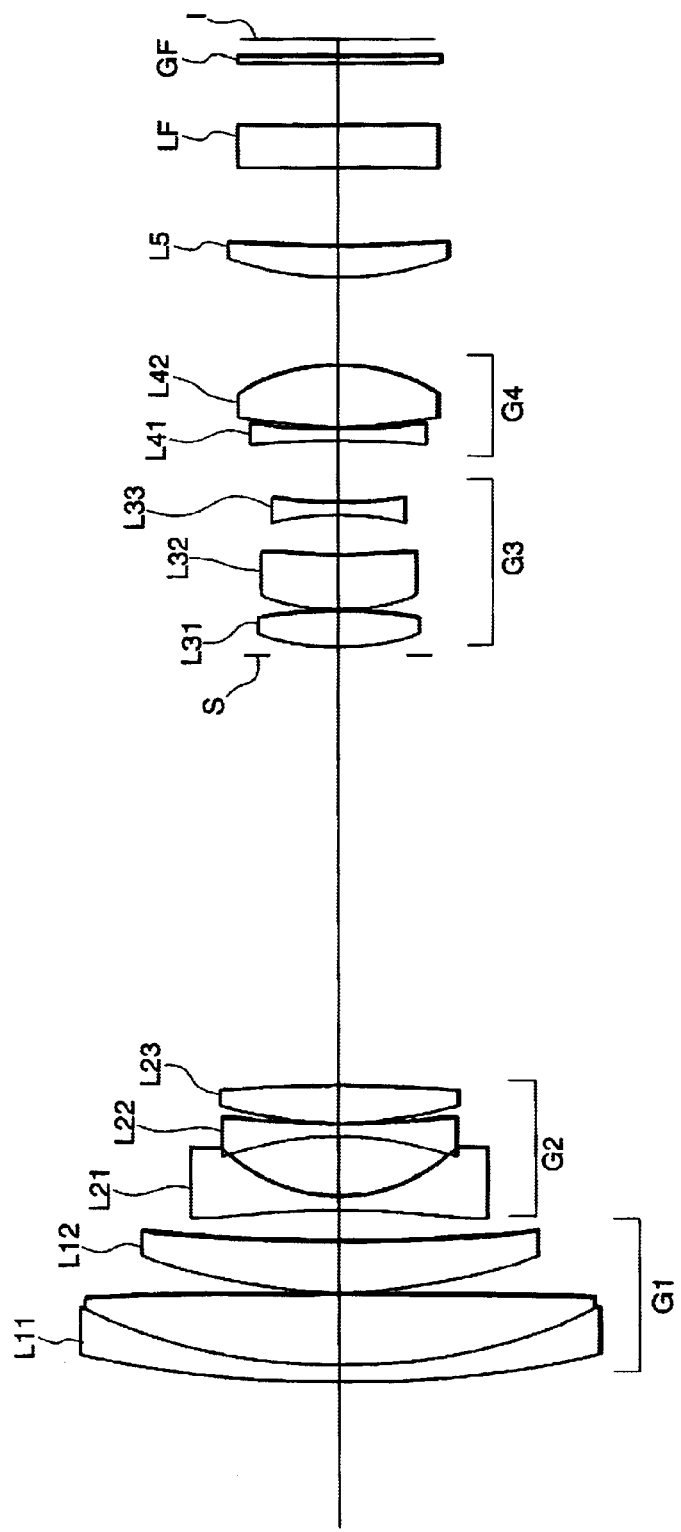
FIG. 26 is a diagram showing the lens arrangement of a zoom lens system according to Example 10 of the second embodiment of the present invention.

FIG. 26 is a diagram showing the lens arrangement of a zoom lens system according to Example 10 of the second embodiment of the present invention. The first lens group G1 is composed of, in order from the object, a cemented positive lens L11 constructed by a negative meniscus lens having a convex surface facing to the object cemented with a double convex positive lens, and a positive meniscus lens L12 having a convex surface facing to the object. The second lens group G2 is composed of, in order from the object, a double concave negative lens L21, a double concave negative lens L22, and a double convex positive lens L23. The third lens group G3 is composed of, in order from the object, a double convex positive lens L31, a positive meniscus lens L32 having a convex surface facing to the object, and a double concave negative lens L33. The fourth lens group G4 is composed of, in order from the object, a double concave negative lens L41, and a double convex positive lens L42. The fifth lens group G5 is composed of a positive meniscus lens L5 having a convex surface facing to the object.

In Example 10, an aperture stop S is arranged to the object side of the third lens group G3 and moved together with the third lens group G3 upon varying the state of lens group positions.

A low-pass filter LF and a protection glass GF are arranged to the image side of the fifth lens group G5.

Various values associated with Example 10 are listed in Table 10.

TABLE 10

(Specifications)

| | W | M | T |
|---|---|---|---|
| F: | 9.36 | 27.00 | 69.00 |
| FNO | 2.88 | 3.77 | 4.07 |
| 2A: | 65.01° | 23.50° | 9.28° |

(Lens Data)

| surface number | r | d | ν | n |
|---|---|---|---|---|
| 1 | 73.6667 | 1.100 | 23.78 | 1.84666 |
| 2 | 37.9880 | 4.500 | 52.32 | 1.75500 |
| 3 | −824.1852 | 0.100 | | |
| 4 | 34.0886 | 3.300 | 81.61 | 1.49700 |
| 5 | 105.6423 | (D5) | | |
| 6 | −59.1801 | 0.950 | 49.61 | 1.77250 |
| 7 | 10.4970 | 4.000 | | |
| 8 | −22.0824 | 0.800 | 55.52 | 1.69680 |
| 9 | 68.0177 | 0.100 | | |
| 10 | 27.7359 | 2.450 | 23.78 | 1.84666 |
| 11 | −72.9332 | (D11) | | |
| 12 | 0.0000 | 0.500 | Aperture Stop S | |
| 13 | 15.1627 | 2.350 | 81.61 | 1.49700 |
| 14 | −30.7859 | 0.100 | | |
| 15 | 14.1059 | 3.500 | 61.18 | 1.58913 |
| 16 | 29.7859 | 2.750 | | |
| 17 | −16.9676 | 0.800 | 42.72 | 1.83481 |
| 18 | 25.0000 | (D18) | | |
| 19 | −57.6997 | 0.800 | 23.78 | 1.84666 |
| 20 | 42.5657 | 0.100 | | |
| 21 | 22.1806 | 4.150 | 61.18 | 1.58913 |
| 22 | −11.9098 | (D22) | | |
| 23 | 20.1476 | 2.000 | 70.24 | 1.48749 |
| 24 | 112.4017 | 5.178 | | |
| 25 | 0.0000 | 2.760 | 64.10 | 1.51680 |
| 26 | 0.0000 | 4.000 | | |
| 27 | 0.0000 | 0.500 | 64.10 | 1.51680 |
| 28 | 0.0000 | (BF) | | |

(Aspherical Surface Data)
Surface Number = 6

| | |
|---|---|
| κ | = 11.0000 |
| C4 | = +5.0238E−5 |
| C6 | = −2.1825E−7 |
| C8 | = +1.3113E−9 |
| C10 | = −4.1676E−12 |

Surface Number = 21

| | |
|---|---|
| κ | = 4.5188 |
| C4 | = −2.2332E−4 |
| C6 | = +6.1982E−7 |
| C8 | = −1.3118E−9 |
| C10 | = −8.1686E−11 |

(Variable Intervals upon Zooming)

| | W | M | T |
|---|---|---|---|
| F | 9.3600 | 27.0000 | 69.0005 |
| D5 | 2.0541 | 14.0490 | 25.1345 |
| D11 | 28.6709 | 11.4789 | 0.3000 |
| D18 | 4.0976 | 1.2027 | 1.0056 |
| D22 | 5.7348 | 17.9430 | 21.8822 |
| BF | 1.0000 | 1.0000 | 1.0000 |

(Values for the conditional expressions)

| | |
|---|---|
| YO | = 5.7 |
| F3N | = −12.004 |
| F3 | = +35.986 |
| (11) | D3P/FT = 0.051 |
| (12) | Yo/(BFW − RE) = 0.172 |
| (13) | Δ4/(FT · FW)$^{1/2}$ = 0.635 |
| (14) | \| F3N \| /FT = 0.174 |
| (15) | \| R31 \| /F3 = 0.472 |
| (16) | (R21 + R22)/(R21 − R22) = −0.510 |

Figure 27A:
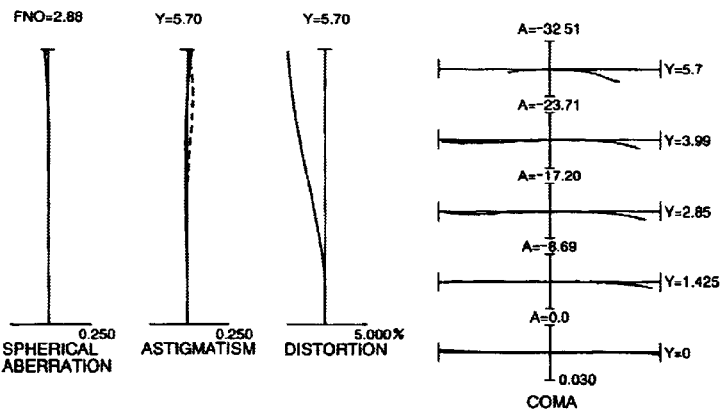
FIGS. 27A to 27C graphically show various aberrations of the zoom lens system according to Example 10 of the second embodiment in the wide-angle end state, the intermediate focal length state, and the telephoto end state, respectively.
Figure 27B:
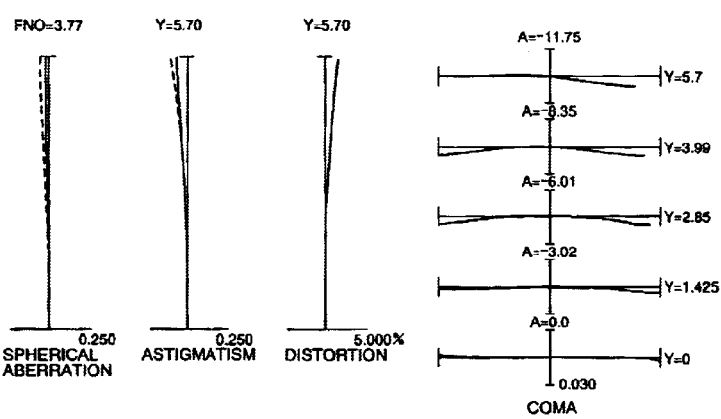
Figure 27C:
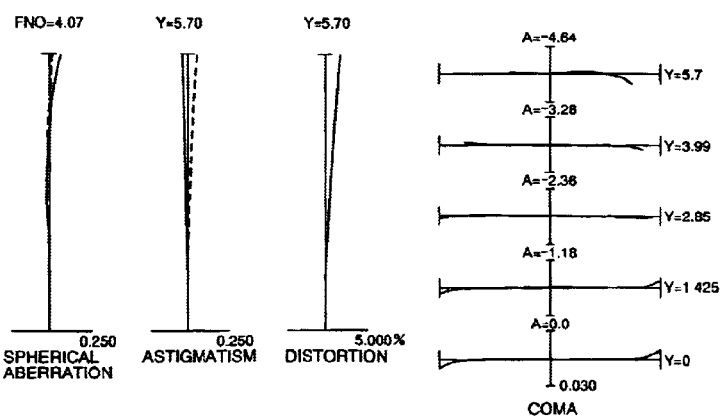

FIGS. 27A to 27C graphically show various aberrations of the zoom lens system according to Example 10 of the second embodiment in a wide-angle end state (F=9.36), an intermediate focal length state (F=27.00), and a telephoto end state (F=69.00), respectively. In the graphs showing coma, the values of coma at image height Y=0, 1.425, 2.85, 3.99, and 5.70 are shown, respectively. A denotes a half angle of view.

As is apparent from the respective graphs showing various aberrations according to Example 10, excellent compensation is made for various aberrations to accomplish high optical performance.

As described above, the present invention makes it possible to provide a zoom lens system having the zoom ratio of about 6 or more, the angle of view of 60° or more in the wide-angle end state together with high optical performance and compactness.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A zoom lens system comprising, in order from an object:

a first lens group having positive refractive power;

a second lens group having negative refractive power;

a third lens group having positive refractive power;

a fourth lens group having positive refractive power; and a fifth lens group having positive refractive power;

when the state of lens group positions varies from a wide-angle end state to a telephoto end state, a separation between the first lens group and the second lens group increasing;

a separation between the second lens group and the third lens group decreasing;

a separation between the third lens group and the fourth lens group varying;

a separation between the fourth lens group and the fifth lens group increasing; and the third lens group and the fourth lens group moving to the object side; and wherein the following conditional expressions are satisfied;

$$4.5 < F1/FW < 8.0$$
$$0.8 < |F2/FW| < 1.8$$
$$2.3 < F3/FW < 4.5$$
$$2.0 < F4/FW < 5.2$$
$$0.2 < (D34W - D34T)/FW < 1.0$$

where FW denotes the focal length of the zoom lens system in the wide-angle end state, F1 denotes the focal length of the first lens group, F2 denotes the focal length of the second lens group, F3 denotes the focal length of the third lens group, F4 denotes the focal length of the fourth lens group, D34W denotes the separation between the third lens group and the fourth lens group in the wide-angle end state, and D34T denotes the separation between the third lens group and the fourth lens group in the telephoto end state.

2. The zoom lens system according to claim 1, wherein when the state of lens group positions varies from the wide-angle end state to the telephoto end state, the first lens group moves such that the position of the first lens group in the telephoto end state is to the object side of the position of the first lens group in the wide-angle end state, and the fifth lens group is fixed, and wherein the following conditional expression is satisfied;

$$0.4 < M1/FW < 3.0$$

where M1 denotes a moving amount of the first lens group when the state of lens group positions varies from the wide-angle end state to the telephoto end state.

3. The zoom lens system according to claim 2, wherein the fourth lens group is composed of a cemented lens constructed by a positive lens element cemented with a negative lens element, and wherein the following conditional expression is satisfied;

$$0.2 < N4N - N4P$$

where N4N denotes a refractive index of the negative lens element in the fourth lens group at d-line ($\lambda$=587.6 nm), and N4P denotes a refractive index of the positive lens element in the fourth lens group at d-line ($\lambda$=587.6 nm).

4. The zoom lens system according to claim 3, wherein the focusing from a distant object to a close object is carried out by moving the fifth lens group to the object side, and wherein the following conditional expression is satisfied;

$$3.0 < F5/FW < 7.0$$

where F5 denotes the focal length of the fifth lens group.

5. The zoom lens system according to claim 4, wherein the fifth lens group is composed of a cemented lens constructed by a positive lens element cemented with a negative lens element, and wherein the following conditional expression is satisfied;

$$15.0 < v5P - v5N$$

where v5P denotes Abbe number of the positive lens element in the fifth lens group, and v5N denotes Abbe number of the negative lens element in the fifth lens group.

6. The zoom lens'system according to claim 4, wherein the fifth lens group is composed of a single positive lens element, and wherein the following conditional expression is satisfied;

$$0.7 < (RR + RF)/(RR - RF) < 2.0$$

where RF denotes a radius of curvature of the object side surface of the positive lens element in the fifth lens group, and RR denotes a radius of curvature of an image side surface of the positive lens element in the fifth lens group.

7. The zoom lens system according to claim 2, wherein the focusing from a distant object to a close object is carried out by moving the fifth lens group to the object side, and wherein the following conditional expression is satisfied;

$$3.0 < F5/FW < 7.0$$

where F5 denotes the focal length of the fifth lens group.

8. The zoom lens system according to claim 7, wherein the fifth lens group is composed of a cemented lens constructed by a positive lens element cemented with a negative lens element, and wherein the following conditional expression is satisfied;

$$15.0 < v5P - v5N$$

where v5P denotes Abbe number of the positive lens element in the fifth lens group, and v5N denotes Abbe number of the negative lens element in the fifth lens group.

9. The zoom lens system according to claim 7, wherein the fifth lens group is composed of a single positive lens element, and wherein the following conditional expression is satisfied;

$$0.7 < (RR + RF)/(RR - RF) < 2.0$$

where RF denotes a radius of curvature of the object side surface of the positive lens element in the fifth lens group, and RR denotes a radius of curvature of an image side surface of the positive lens element in the fifth lens group.

10. The zoom lens system according to claim 1, wherein the fourth lens group is composed of a cemented lens constructed by a positive lens element cemented with a negative lens element, and wherein the following conditional expression is satisfied;

$$0.2<N4N-N4P$$

where N4N denotes a refractive index of the negative lens element in the fourth lens group at d-line (λ=587.6 nm), and N4P denotes a refractive index of the positive lens element in the fourth lens group at d-line (λ=587.6 nm).

11. The zoom lens system according to claim 10, wherein the focusing from a distant object to a close object is carried out by moving the fifth lens group to the object side, and wherein the following conditional expression is satisfied;

$$3.0<F5/FW<7.0$$

where F5 denotes the focal length of the fifth lens group.

12. The zoom lens system according to claim 11, wherein the fifth lens group is composed of a commented lens constructed by a positive lens element cemented with a negative lens element, and wherein the following conditional expression is satisfied;

$$15.0<v5P-v5N$$

where v5P denotes Abbe number of the positive lens element in the fifth lens group, and v5N denotes Abbe number of the negative lens element in the fifth lens group.

13. The zoom lens system according to claim 11, wherein the fifth lens group is composed of a single positive lens element, and wherein the following conditional expression is satisfied;

$$0.7<(RR+RF)/(RR-RF)<2.0$$

where RF denotes a radius of curvature of the object side surface of the positive lens element in the fifth lens group, and RR denotes a radius of curvature of an image side surface of the positive lens element in the fifth lens group.

14. The zoom lens system according to claim 1, wherein the focusing from a distant object to a close object is carried out by moving the fifth-lens group to the object side, and wherein the following conditional expression is satisfied;

$$3.0<F5/FW<7.0$$

where F5 denotes the focal length of the fifth lens group.

15. The zoom lens system according to claim 14, wherein the fifth lens group is composed of a cemented lens constructed by a positive lens element cemented with a negative lens element, and wherein the following conditional expression is satisfied;

$$15.0<v5P-v5N$$

where v5P denotes Abbe number of the positive lens element in the fifth lens group, and v5N denotes Abbe number of the negative lens element in the fifth lens group.

16. The zoom lens system according to claim 14, wherein the fifth lens group is composed of a single positive lens element, and wherein the following conditional expression is satisfied;

$$0.7<(RR+RF)/(RR-RF)<2.0$$

where RF denotes a radius of curvature of the object side surface of the positive lens element in the fifth lens group, and RR denotes a radius of curvature of an image side surface of the positive lens element in the fifth lens group.

17. A zoom lens system comprising, in order from an object:
- a first lens group having positive refractive power;
- a second lens group having negative refractive power;
- a third lens group having positive refractive power; and
- a fourth lens group having positive refractive power;
- wherein when the state of lens group positions varies from a wide-angle end state to a telephoto end state, at least the first lens group and the fourth lens group move to the object side such that;
- a separation between the first lens group and the second lens group increases;
- a separation between the second lens group and the third lens group decreases; and
- a separation between the third lens group and the fourth lens group decreases; and
- the third lens group being composed of three lens elements which are, in order from the object, a first positive lens element, a second positive lens element, and a negative lens element; and
- the fourth lens group including a positive lens element located to the most image side and a negative lens element located to the object side of the positive lens element; and
- wherein the following conditional expressions are satisfied;

$$0.015<D3P/FT<0.100$$

$$0.10<YO/(BFW-RE)<0.25(RE<0)$$

$$0.4<\Delta 4/(FT \cdot FW)^{1/2}<1.0$$

where D3P denotes the thickness of the second positive lens element in the third lens group, FT denotes the focal length of the zoom lens system in the telephoto end state, YO denotes a half of the diagonal of the image frame, RE denotes a radius of curvature of the most image side surface of the fourth lens group, BFW denotes a distance from the most image side surface of the fourth lens group to the image plane in the wide-angle end state, Δ4 denotes a moving amount of the fourth lens group which is positive upon moving to the object side, when the state of lens group positions varies from the wide-angle end state to the telephoto end state, and FW denotes the focal length of the zoom lens system in the wide-angle end state.

18. The zoom lens system according to claim 17, wherein at least one of the following conditional expressions is satisfied;

$$0.1<|F3N|/FT<0.7$$

$$0.2<|R31|/F3<2.0$$

where F3N denotes the focal length of the negative lens element located in the third lens group, FT denotes the focal length of the zoom lens system in the telephoto end state, R31 denotes a radius of curvature of the image side surface of the negative lens element located in the third lens group, and F3 denotes the focal length of the third lens group.

19. The zoom lens system according to claim 18, wherein the second lens group is composed of three lens elements which are, in order from the object, a first negative lens element having a concave surface facing to the image, a second negative lens element having a concave surface facing to the object, and a positive lens element having a convex surface facing to the object, and wherein the following conditional expression is satisfied;

$$-0.7<(R21+R22)/(R21-R22)<0$$

where R21 denotes a radius of curvature of the image side surface of the first negative lens element located in the second lens group, and R22 denotes a radius of curvature of the object side surface of the second negative lens element located in the second lens group.

20. The zoom lens system according to claim 17, wherein the second lens group is composed of three lens elements which are, in order from the object, a first negative lens element having a concave surface facing to the image, a second negative lens element having a concave surface facing to the object, and a positive lens element having a convex surface facing to the object, and wherein the following conditional expression is satisfied;

$$-0.7<(R21+R22)/(R21-R22)<0$$

where R21 denotes a radius of curvature of the image side surface of the first negative lens element located in the second lens group, and R22 denotes a radius of curvature of the object side surface of the second negative lens element located in the second lens group.

* * * * *